(12) United States Patent
Guim Bernat et al.

(10) Patent No.: US 12,450,148 B2
(45) Date of Patent: Oct. 21, 2025

(54) SYSTEMS, METHODS, ARTICLES OF MANUFACTURE, AND APPARATUS FOR END-TO-END HARDWARE TRACING IN AN EDGE NETWORK

(71) Applicant: Intel Corporation, Santa Clara, CA (US)

(72) Inventors: Francesc Guim Bernat, Barcelona (ES); Sunil Cheruvu, Tempe, AZ (US); Tushar Gohad, Phoenix, AZ (US); Karthik Kumar, Chandler, AZ (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 744 days.

(21) Appl. No.: 17/561,516

(22) Filed: Dec. 23, 2021

(65) Prior Publication Data
US 2022/0121556 A1    Apr. 21, 2022

(51) Int. Cl.
*G06F 11/362* (2025.01)
*G06F 11/3698* (2025.01)

(52) U.S. Cl.
CPC ...... *G06F 11/3636* (2013.01); *G06F 11/3698* (2025.01)

(58) Field of Classification Search
CPC .......................... G06F 11/3636; G06F 11/3698
USPC .................................................. 717/128–152
See application file for complete search history.

(56) References Cited

U.S. PATENT DOCUMENTS

| | | | | |
|---|---|---|---|---|
| 5,742,728 A * | 4/1998 | Yanagihara | .......... | H04N 9/8042 386/346 |
| 6,721,941 B1 * | 4/2004 | Morshed | ............ | G06F 11/3612 717/124 |
| 7,137,105 B2 * | 11/2006 | Madsen | ............. | G06F 11/3698 714/45 |
| 8,032,875 B2 * | 10/2011 | Kosche | .................. | G06F 8/443 717/130 |
| 8,578,348 B2 * | 11/2013 | Fliess | .................. | G06F 11/3457 717/138 |
| 8,762,951 B1 * | 6/2014 | Kosche | ............... | G06F 11/3476 717/127 |

(Continued)

OTHER PUBLICATIONS

Matsubara et al, "Fast Mining and Forecasting of Complex Time-Stamped Events", ACM, pp. 1-12 (Year: 2012).*

(Continued)

*Primary Examiner* — Anil Khatri
(74) *Attorney, Agent, or Firm* — HANLEY, FLIGHT & ZIMMERMAN, LLC

(57) ABSTRACT

Systems, methods, articles of manufacture, and apparatus for end-to-end hardware tracing in an Edge network are disclosed. An example compute device includes at least one memory, instructions in the compute device, and processing circuitry to execute the instructions to, in response to receiving detecting an object having a global group identifier, generate monitoring data corresponding to a respective process executing on the compute device, the monitoring data including a process identifier, index the monitoring data having the process identifier to the corresponding global group identifier, synchronize a time stamp of the monitoring data to a network time protocol corresponding to the global group identifier, and transmit the indexed and synchronized monitoring data as tracing data in to the a tracing datastore.

23 Claims, 19 Drawing Sheets

(56) References Cited

U.S. PATENT DOCUMENTS

| | | | |
|---|---|---|---|
| 8,813,055 B2* | 8/2014 | Kosche | G06F 11/3612 |
| | | | 717/130 |
| 9,436,589 B2* | 9/2016 | Li | G06F 9/505 |
| 9,747,191 B1* | 8/2017 | Marolia | G06F 11/3688 |
| 10,296,425 B2* | 5/2019 | Huang | G06F 16/27 |
| 10,650,174 B1* | 5/2020 | Wilmot | G06F 30/3308 |
| 11,263,268 B1* | 3/2022 | Bourbie | G06F 16/2228 |
| 2020/0162589 A1 | 5/2020 | Vijayadharan et al. | |
| 2020/0186592 A1* | 6/2020 | Bernat | H04L 43/106 |
| 2021/0117249 A1 | 4/2021 | Doshi et al. | |

OTHER PUBLICATIONS

Avgustinov et al, "Making Trace Monitors Feasible", ACM, pp. 1-19 (Year: 2007).*

Zhou et al, "TraceBench: An Open Data Set for Trace-Oriented Monitoring", IEEE, pp. 1-8 (Year: 2014).*

Li et al, "Monitor and Analyze Rare ROS2 Performance Issues with a Unified Tracing Framework", ACM, pp. 1-10 (Year: 2024).*

Mace et al, "Pivot Tracing: Dynamic Causal Monitoring for Distributed Systems", ACM, pp. 1-28 (Year: 2018).*

Kaldor et al, "Canopy: An End-to-End Performance Tracing and Analysis System", ACM, pp. 1-17 (Year: 2017).*

Taherizadeh et al., "Monitoring self-adaptive applications within edge computing frameworks: A state-of-the-art review," The Journal of Systems and Software, Nov. 2, 2017, 20 pages.

European Patent Office, "Extended European Search Report," issued in connection with European Application No. 22201735.2, dated May 12, 2023, 8 pages.

European Patent Office, "Communication pursuant to Article 94(3) EPC," issued in connection with European Patent Application No. 22201735.2-1216, dated Nov. 9, 2023, 5 pages.

European Patent Office, "Communication under Rule 71(3) EPC—Intention to Grant," issued in connection with European Patent Application No. 22201735.2-1215, dated Jan. 14, 2025, 109 pages.

* cited by examiner

1310

```
┌─────────────────────────────────────────────┐
│  PROCESS MONITORING DATA WITH ATTAINED      │
│  PROCESS ID(S) TO GENERATE TRACING DATA     │
└─────────────────────────────────────────────┘
                      │
                      ▼                         1402
┌─────────────────────────────────────────────┐
│ RECEIVE MONITORING DATA HAVING CORRESPONDING PROCESS ID(S) │
└─────────────────────────────────────────────┘
                      │
                      ▼                         1404
┌─────────────────────────────────────────────┐
│ MAP MONITORING DATA HAVING PROCESS ID(S) WITH GGID FOR WHICH │
│      THE CORRESPONDING PROCESS(ES) EXECUTED                  │
└─────────────────────────────────────────────┘
                      │
                      ▼                         1406
┌─────────────────────────────────────────────┐
│   DETERMINE NTP REQUIREMENTS OF CORRESPONDING GGID          │
└─────────────────────────────────────────────┘
                      │
                      ▼                         1408
┌─────────────────────────────────────────────┐
│         SYNCHRONIZE TIMESTAMP BASED ON GGID                 │
└─────────────────────────────────────────────┘
                      │
                      ▼                         1410
┌─────────────────────────────────────────────┐
│  GENERATE OBJECT HAVING TRACING DATA TO SEND AND/OR STORE   │
│                   THE TRACING DATA                          │
└─────────────────────────────────────────────┘
                      │
                      ▼
          ┌───────────────────────┐
          │ RETURN TO BLOCK 1312  │
          └───────────────────────┘
```

FIG. 14

SYSTEMS, METHODS, ARTICLES OF MANUFACTURE, AND APPARATUS FOR END-TO-END HARDWARE TRACING IN AN EDGE NETWORK

FIELD OF THE DISCLOSURE

This disclosure relates generally to Edge network environments and, more particularly, to systems, methods, articles of manufacture, and apparatus for end-to-end hardware tracing in an Edge network.

BACKGROUND

Edge network environments (e.g., an Edge, Fog, multi-access Edge computing (MEC), or Internet of Things (IoT) network) enable a workload execution (e.g., an execution of one or more computing tasks, an execution of a machine learning model using input data, etc.) near endpoint devices that request an execution of the workload. Edge network environments may include infrastructure, such as an Edge service, that is connected to a cloud infrastructure, endpoint devices, or additional Edge infrastructure via networks such as the Internet.

BRIEF DESCRIPTION OF THE DRAWINGS

FIGS. 13-14 are flowcharts representative of example machine readable instructions and/or example operations that may be executed by example processor circuitry to implement the scale-out tracing circuitry of FIG. 10.

Figure 1:
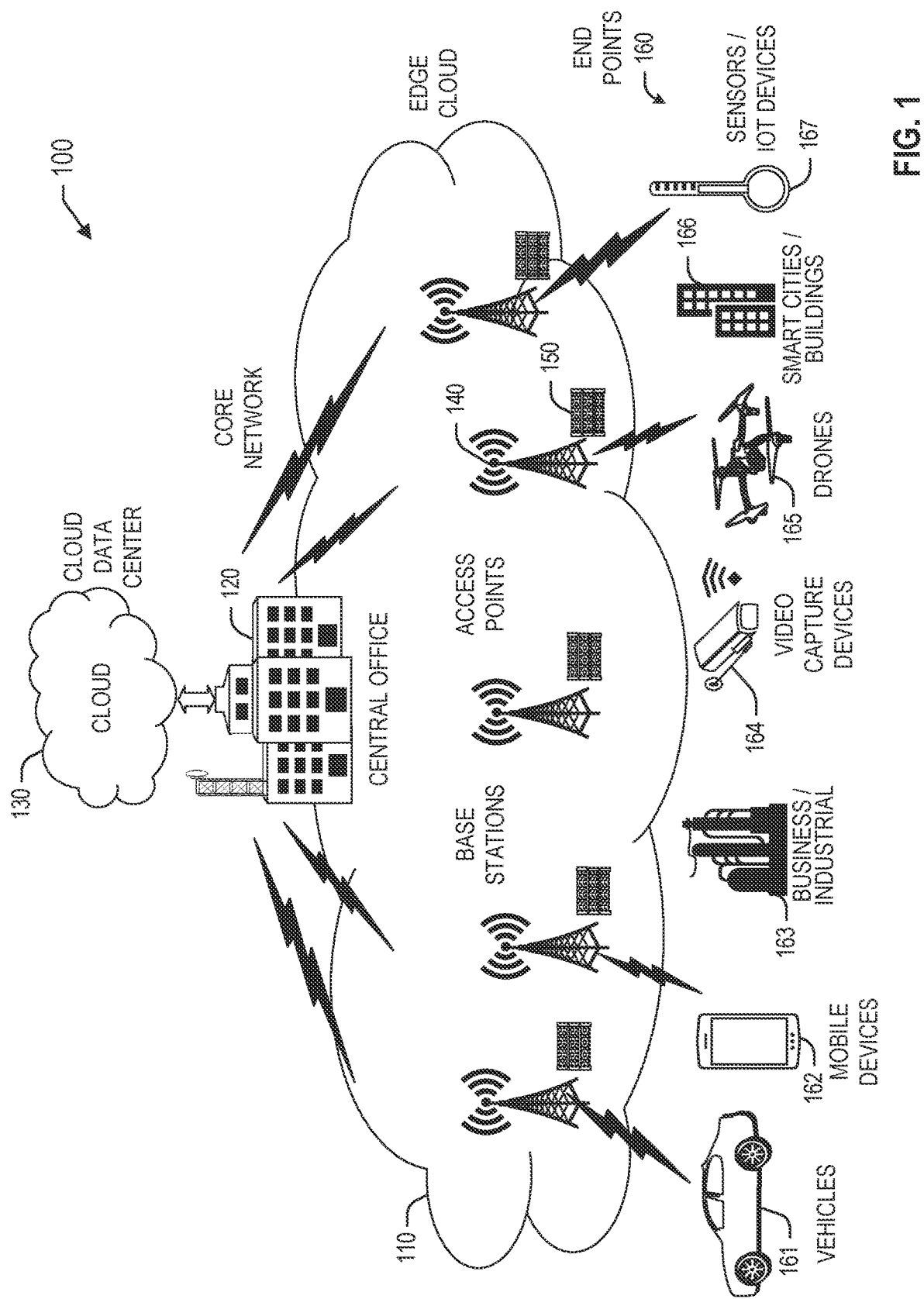
FIG. 1 illustrates an overview of an example Edge cloud configuration for Edge computing.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Edge applications are becoming increasingly distributed, with scale-out (e.g., using multiple servers distributed in multiple Edge tiers to execute a single application) emerging as a technique to achieve more advanced architecture. An Edge application facilitates a service via an Edge network (e.g., a distributed computing infrastructure, as described in further detail below). The Edge application may include any number and/or type of microservices, where each microservice runs in its own process and communicates using protocols (e.g., an HTTP resource API). For example, a docker may be utilized by an Edge application to containerize a microservice. The multiple dockers may facilitate multiple microservices that may be connected in a pipeline fashion to facilitate the Edge application.

Analysis of an Edge application (e.g., Edge service, Edge function, etc.) is a complex and substantial undertaking, especially compared to a service that executes on a single node (e.g., a server). For example, a content delivery network (CDN) request from an end point device may traverse multiple Edge nodes and multiple tiers of Edge networks before arriving on the Edge tier that caches and/or presents requested data to a requester. Further, the Edge application may scale-up or scale-down dynamically. For example, deployment of one microservice of the Edge application may be moved from a first Edge node to a second Edge node that has different hardware capabilities (e.g., perhaps depending on a load of the first Edge node). Analysis of the Edge application, which traverses a multitude of devices and locations, is much more convoluted than analysis of a service executing on a single node such as a monolithic application, a cloud-native application (e.g., herein referred to as a single-node application). Current scale-out computing systems lack hardware support capable of tracking an Edge application as it executes in the Edge computing system. As such, performance analysis gaps currently exist in analysis tools for the Edge application, such as debugging tools and/or performance analysis tools. A solution is needed that provides hardware support for tracking the Edge application is it propagates from the Edge nodes of the Edge computing system to enable proper analysis of the Edge application.

As disclosed herein, the Edge tier refers to a category of the Edge network that is based on a functional division of software that runs on infrastructure. Such division allows a tier to run on an operating system and server platform (e.g., web server, application server, database server) that best fits its functional requirements. For example, the Edge application may utilize a three-tier architecture, including a presentation tier (e.g., to display information to and/or collect information from an end user via an end point device), an application tier (e.g., to process information from the end user via a server), and a data tier (e.g., to store and/or manage data at a data center). However, the Edge application may utilize an architecture than has less than three tiers or more than three tiers.

Application (e.g., service, function etc.) analysis is a process of monitoring and analyzing application data, such as usage and performance metrics, to generate meaningful insights about performance of the application. For example, application delivery analysis may provide insights on how well a network (e.g., Edge network, single-node, etc.) delivers the application to users. Application analysis enables an entity to troubleshoot performance questions and to root cause issues within application delivery. Application analysis may include performance profiling (e.g., discovering which parts of an application consume a disproportionate about of time or system resource), debugging (e.g., root cause an application delivery issue), vulnerability assessment (e.g., to identify a vulnerability in the application), code analysis (e.g., to find flaws in code), etc. Application data used for analysis may include request and failure rates, response time, exceptions, counts, etc. End-to-end analysis of the application requires monitoring application delivery at each device the application traverses.

Many techniques currently exist for analyzing the single node application. One common technique is to use a function-based profiler to examine hotspots. For example, the function-based profiler may easily determine that a lock-intensive function is consuming 35% of central processing unit (CPU) time without doing any useful work. However, a similar function-based profiler in a multi-tier Edge architecture may not be able to accomplish the same objective, especially considering there are multiple Edge tiers with multiple Edge nodes spanning multiple locations.

Aggregation of collective CPU utilization is often considered a useful performance debugging abstraction for a single-node application. For example, CPU utilization (e.g., CPU time) may allow an analyst to understand where the single-node application is collectively spending its time in execution. However, CPU utilization may not be a useful measure of performance for analysis and/or debugging of the Edge application. For example, consider an analyst that aggregates CPU utilization for an Edge application. As the analyst drills into the execution, the analyst may discover there are multiple Edge nodes involved, some or all of which may be geographically and topologically diverse. The analyst may further discover that network latencies, such as a latency of an object as it travels between nodes, are accounted as part of the execution time (e.g., CPU time). The time spent on a network latency would then be part of the CPU time, meaning that the CPU time would be an inaccurate measure of CPU utilization. Accordingly, the simple notion of "CPU time" may not be an appropriate abstraction when considering debugging distributed computing execution paths.

Current application profilers for single-node applications may determine whether a particular resource participating in an execution flow is failing. For example, a failing server for the single node application would be easily detectable, even if the server seems to fail at random. This is because a single server is utilized in such an application. If a data packet disappears after it leaves an end point device, it can be easily determined that the server is the issue. However, in the case of a particular resource failing in an Edge network infrastructure for the Edge application, diagnosis can be challenging without proper visualization of the distributed execution context and taxonomy. For example, disappearance of a data packet after the data packet leaves an end point device could have been the result of any Edge node that the packet may traversed in an Edge computing system. Today, resource failure in the Edge network is a complex problem that Edge application customers (e.g., streaming media customers, etc.) are experiencing. Accordingly, a new solution for analyzing the Edge application is needed.

A potential solution for analyzing the Edge application includes launching a separate and independent application profiler on each Edge node. However, such an approach cannot scale out for large clusters. Further, such an approach cannot be employed in multi-tenant deployments (e.g., where a node runs more than one application) because aggregation of information cannot be accomplished in such a scenario. Accordingly, example solutions disclosed herein for analyzing the Edge application facilitate a comprehensive, end-to-end approach, where all elements that participate as part of the whole are accounted for in the analysts view.

Examples disclosed herein enable a scale-out tracing system structured to enable analysis of an Edge application (or service, function, etc.) using an end-to-end tracing approach. Certain examples enable tracking of an service as the service propagates from various Edge nodes. In some examples, a hook is integrated into an Edge computing system that provides a mechanism by which to perform tracing of a service across a heterogenous environment. For example, a hardware hook may be integrated into an Edge device, which may be utilized to expose processes into an integrated software hook that enables tracing across the various Edge nodes.

Examples disclosed herein enable fine-grained billing for scale-out service providers, such as Edge service providers. Pricing is at least one relevant component for of Edge computing (and other computing infrastructures) because it directly affects provides' revenue and customers' budget. Coarse billing includes billing for a minimum unit, such as a fixed rate for Edge resource consumption (e.g., per hour) per billing cycle. However, coarse billing may result in a customer paying for more resource usage than was actually consumed. Further, such an approach may lead to a resource sitting idle, which could have been used for another customer. Advantageously, examples disclosed herein enable a fine-grained billing scheme for services provided by an Edge service provider that can include detailed information about usage of resources (e.g. memory, compute, storage, network). Examples disclosed herein enable data collection and analysis of an Edge service that may be used for advanced billing.

Examples disclosed herein enable aggregation of information across multiple Edge locations and/or multiple Edge nodes. The aggregation of information facilitates a top-down view of application performance as well as a composite perspective with drill-down capabilities. For example, an Edge computing system may include four Edge geographies, each of which may involve ten or more Edge nodes. Certain examples may allow an application analyst to aggregate data generated at each Edge node in the Edge computing system and to analyze such data to form a holistic view.

Examples disclosed herein may be applied for multi-node applications as well as applications that use multi-tenant nodes. Examples disclosed herein enable analysis of an application in view of concurrent execution on a single node. Edge computing can be highly distributed. In some Edge computing systems, a single node may execute multiple processes for a signal tenant and/or execute processes for multiple tenants. In some Edge computing systems, a single tenant workflow may span multiple Edge nodes and multiple Edge networks, suggesting that execution order is truly concurrent (e.g., not just multi-programmed). In some Edge computing systems, distributed concurrency control mechanisms may be highly sophisticated. In some Edge computing systems, virtualization and cloud infrastructures add an additional dynamic to concurrency as the workload hosting environments may not be cognizant of underlying virtualization. Accordingly, examples disclosed herein include mechanisms that enable consideration of the various components, processes, and entities in the Edge computing system. In some examples, a process identifier is utilized to identify and/or trace a specific process that executes on an Edge node.

Examples disclosed herein include mechanisms that enable analysis of the Edge application that considers a workflow. In a distributed execution context, such as Edge computing context, a node may execute numerous processes in a short period of time. A workflow that is distributed and utilizes a node that has concurrent execution (perhaps of numerous additional workflows) may require context identification of a process that belongs to a specific workflow (for a specific service, entity, etc.), which is independent of host-specific execution contexts (e.g. a thread, a process, a virtual machine, a container etc.). Accordingly, examples disclosed herein enable inclusion of a context identifier which is attached to an object (e.g., a data packet, a request, etc.) belonging to a specific workflow. In some examples, a global group identifier (GGID) is used to link and/or track a set of node-specific processes, threads etc. occurring in a single node environment. In some examples, the GGID is attached to data, such as telemetry data, that is generated during execution of a process in the single node environment. In some examples, the GGID is used to trace an application as the work traverses multiple Edge nodes. The GGID may be attached via an infrastructure, a software element, etc.

Examples disclosed herein enable resource alignment of data generated across multiple geographies and networks. Resource alignment is a process of analyzing whether a utilization of resources (e.g., resources in an Edge computing system) aligns with an objective of an entity (e.g., an Edge service provider, an Edge application provider, etc.). For example, the Edge service provider may desire to minimize a cost of facilitating a service for the Edge application provider. By abstracting data collected using the end-to-end tracing approach as disclosed herein, the Edge service provider is able to determine whether the utilization of resources for the service aligns with the Edge service provider's goal of minimizing costs of providing the service. In some examples, a data model abstraction is utilized to analyze the Edge application, which traverses multiple Edge nodes. In some examples, the data model abstraction enables partition of the data generated across the multiple geographies and networks according to a specific category, such as geographic location, operation, stage of completion, etc. Such data partition enables an analyst to determine how resources are utilized, whether resource alignment has been achieved, and/or whether the Edge application may benefit from re-alignment of resources.

Examples disclosed herein enable context abstraction for an Edge application analysis tool, such as debugging tool. Context refers to a piece of information that can be used to characterize a situation of a participation in an interaction. The Edge computing system includes a heterogeneous collection of computational resources (e.g., endpoint devices, Edge nodes, data center, etc.). The resources in the Edge computing system are independent of the services they execute. Accordingly, the analysis tool for the Edge application must be able to consider differences in these resources to accurately analyze the Edge application. In some examples, the analysis (e.g., debugging) tool may consider differences between Edge nodes (e.g., differences in compute capability, memory population, core count, demand(s) from competing tenants, etc.) in the Edge computing system during analysis of the Edge application to present information (e.g., data) to the analysist in a manner that is useful for analysis and debugging. For example, a determination of the analysis tool that 30% of a CDN request application time was spent in a function across 64 Edge nodes may require the analysis tool to factor in differences (if any) between the 64 Edge nodes. The difference may be in a quantity of cores of the Edge node, such as if half of the 64 Edge nodes contain 28 cores while the other half of the 64 Edge nodes contain 22 cores. Additionally or alternatively, the difference may be in a clock speed of the Edge nodes (e.g., a debugging tool that presents a function profile in terms of time may require accounting for a respective clock speed of the various nodes). In some examples, the debugging tool may consider differences between Edge nodes during a debugging process. Some examples disclosed herein attach a node ID to an object that traverses devices in the Edge computing system. The node ID may record compute capability of the respective nodes to enable an analyst (e.g., profiler, etc.) to consider such differences during when analyzing the Edge service.

Examples disclosed herein enable a debugging function (e.g., a debug-let, etc.) for a distributed application (e.g., a cloud native application, Edge application, etc.). A distributed application utilizes a set of microservices, which may be connected in a pipeline fashion. For example, a first microservice executing a first function on a first node may call a second function on a second node (e.g., whose behavior is suspect). Certain examples may enable the debug-let to perform an isolated invocation of the second function with test data to verify proper expected behavior.

Some examples disclosed herein utilize a distributed database, such as a blockchain, to store tracing data for an Edge application. A blockchain is a decentralized database that is shared among nodes in a computer network, such as an Edge computing system. The blockchain stores information (e.g., encrypted information, data, etc.) together in groups referred to as blocks. The blockchain links (e.g., chains) the blocks together to form a chronological and immutable a record (e.g., a ledger, a timeline of transactions, etc.). That is, new information received after a block is added to the block chain is compiled into a new block and added to the chain. In some examples, the blockchain is integrated into each Edge node of an Edge computing system. In some examples, the blockchain is utilized to keep a record for the Edge application as it traverses multiple Edge nodes in the Edge computing system using an identifier, such as the global group identifier. In other words, end-to-end tracing may be accomplished via the Edge application by utilizing the blockchain. Tracing data corresponding to a GGID is added in real-time to the blockchain. The blockchain and corresponding data may be used by an analyst to analyze the Edge application and/or the Edge computing system. In some examples, a separate block may be produced from a blockchain resulting in a fork extending from the blockchain.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and Internet-of-Things (IoT) devices 167, etc.) than the cloud data center 130. Compute, memory, and storage resources that are offered at the Edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services (such as services provided by an Edge application), through the distribution of more resources which are located closer both geographically and in network access time. In this manner, Edge computing attempts to bring the compute resources to the workload data where appropriate, or bring the workload data to the compute resources.

The following describes aspects of an Edge cloud architecture that covers multiple potential deployments and addresses restrictions that some network operators or service providers may have in their own infrastructures. These include, variation of configurations based on the Edge location (because Edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

As Edge applications continue to scale-out, there is an increased need for analysis tools (e.g., debugging and/or performance optimization tools) that can be deployed across multiple Edge nodes and Edge networks. Traditional applications are simple to analyze, having a variety of tools to perform debugging, performance analysis, etc. In contrast to the network architecture of FIG. 1, traditional applications (e.g., monolithic applications, cloud-based applications, etc.) are reliant on a local device or remote cloud data storage and processing to exchange and coordinate information. An object may be sent from user equipment to a server (e.g., a clous server), and vice versa, without traversing an intermediary node (e.g., compute device). However, an Edge application may highly distributed, scaled-out, and may be decomposed into a plurality of micro-services. When objects corresponding to a specific Edge application traverse multiple Edge nodes spanning multiple locations, there must be a holistic mechanism to inspect the application's execution state and to aggregate the distributed execution to form a holistic view.

Figure 2:
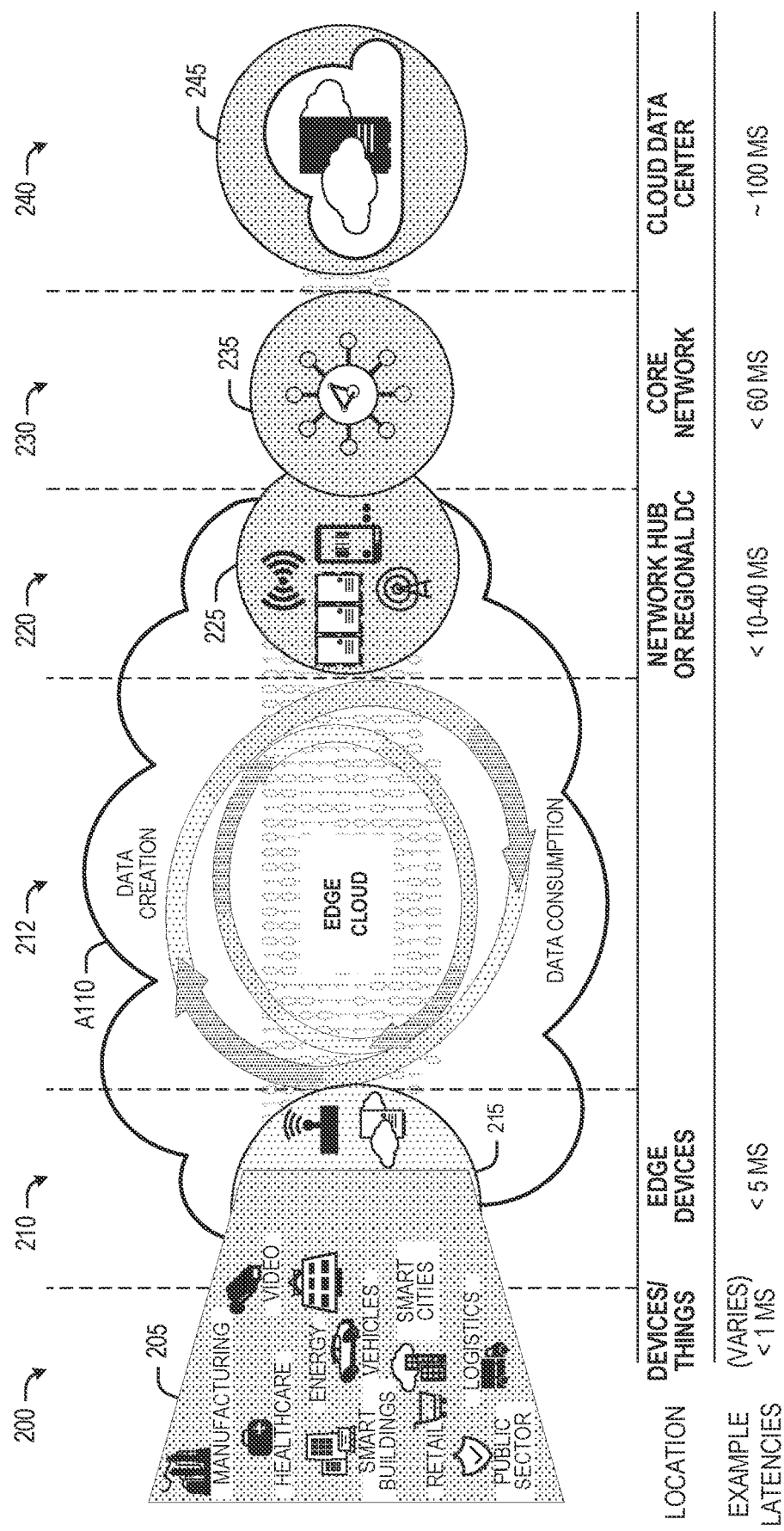
FIG. 2 illustrates operational layers among endpoints, an example Edge cloud, and example cloud computing environments.

FIG. 2 illustrates operational layers among endpoints, an Edge cloud, and cloud computing environments. Specifically, FIG. 2 depicts examples of computational use cases 205, utilizing the Edge cloud 110 of FIG. 1 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer 240). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. Advantageously, examples disclosed herein enable analysis of the end-to-end service and tracing across the service-flow. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, location detection, video surveillance, connected cars, etc.) in real-time or near real-time, and meet ultra-low latency requirements for these multiple applications. These advantages enable a whole new class of applications (e.g., Virtual Network Fields (VNFs), Function-as-a-Service (FaaS), Edge-as-a-Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Further, application analysis is increasingly difficult as services scale out because the service may traverse numerous devices. Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 210-230), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. Example hardware for implementing an appliance computing device is described in conjunction with FIGS. 8 and 9. The Edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
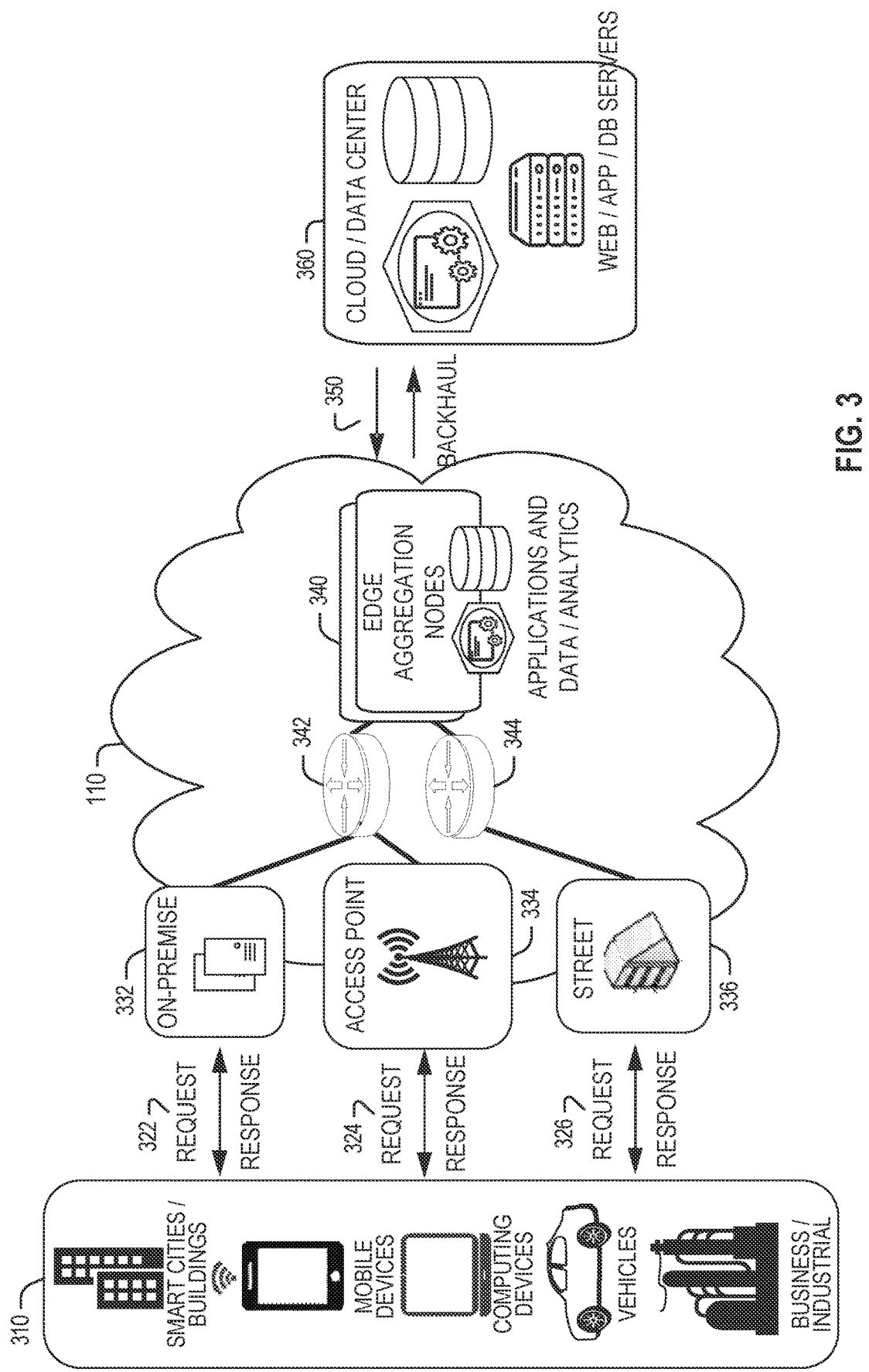
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 of FIG. 1 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center (DC) 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

Figure 4:
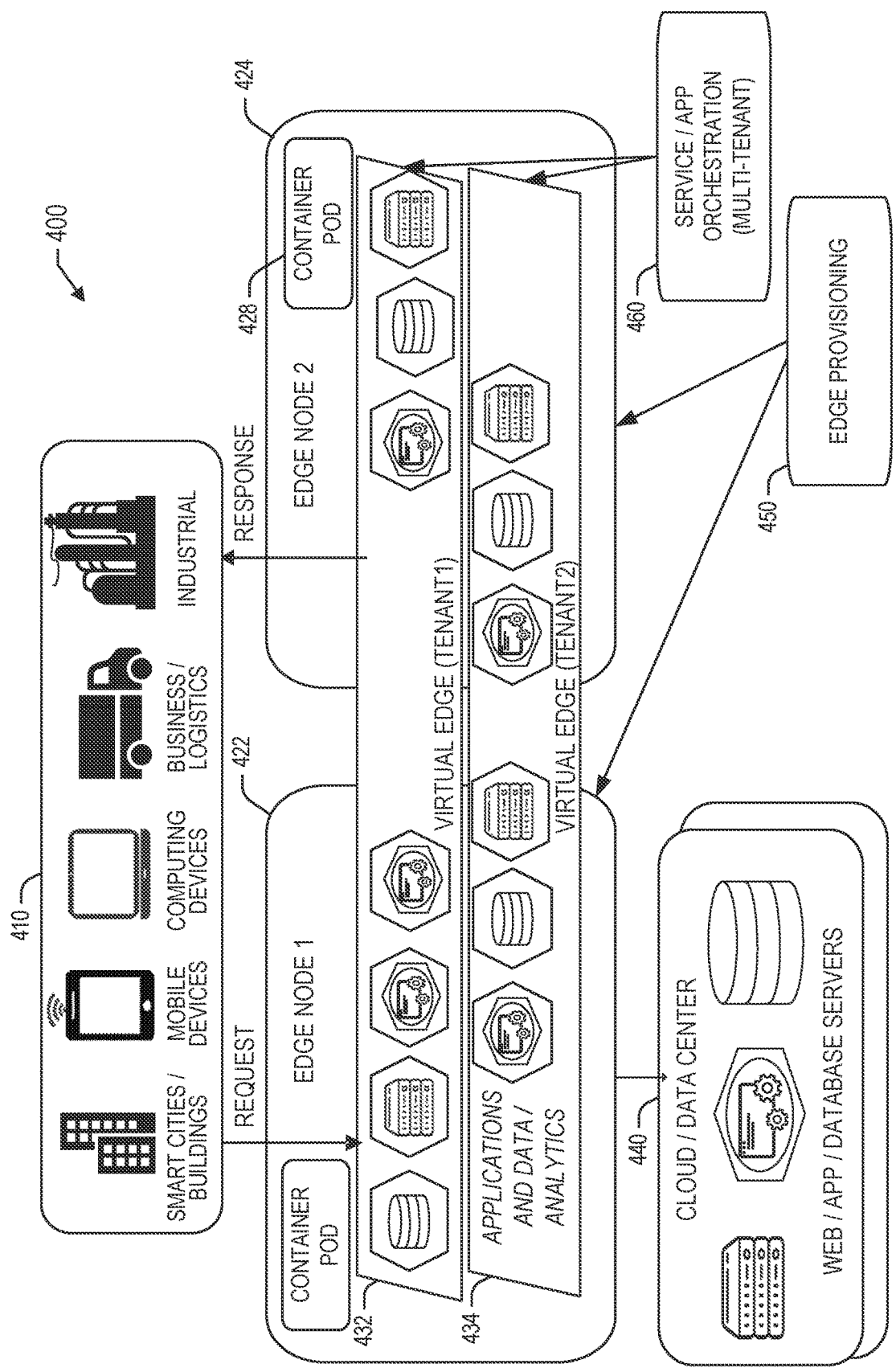
FIG. 4 illustrates deployment of a virtual Edge configuration in an Edge computing system operated among multiple Edge nodes and multiple tenants.

FIG. 4 illustrates deployment and orchestration for virtualized and container-based Edge configurations across an Edge computing system operated among multiple Edge nodes and multiple tenants (e.g., users, providers) which use such Edge nodes. Specifically, FIG. 4 depicts coordination of a first Edge node 422 and a second Edge node 424 in an Edge computing system 400, to fulfill requests and responses for various client endpoints 410 (e.g., smart cities/building systems, mobile devices, computing devices, business/logistics systems, industrial systems, etc.), which access various virtual Edge instances. Here, the virtual Edge instances 432, 434 provide Edge compute capabilities and processing in an Edge cloud, with access to a cloud/data center 440 for higher-latency requests for websites, applications, database servers, etc. However, the Edge cloud enables coordination of processing among multiple Edge nodes for multiple tenants or entities.

In the example of FIG. 4, these virtual Edge instances include: a first virtual Edge 432, offered to a first tenant (Tenant 1), which offers a first combination of Edge storage, computing, and services; and a second virtual Edge 434, offered to a second tenant (Tenant 2), which offers a second combination of Edge storage, computing, and services. The virtual Edge instances 432, 434 are distributed among the Edge nodes 422, 424, and may include scenarios in which a request and response are fulfilled from the same or different Edge nodes. The configuration of the Edge nodes 422, 424 to operate in a distributed yet coordinated fashion occurs based on Edge provisioning functions 450. The functionality of the Edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective Edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual Edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous Edge node. As part of migration of a container, a pod controller at a source Edge node may obtain a migration key from a target Edge node pod controller where the migration key is used to wrap the container-specific keys. When the container/pod is migrated to the target Edge node, the unwrapping key is exposed to the pod controller that then decrypts the wrapped keys. The keys may now be used to perform operations on container specific data. The migration functions may be gated by properly attested Edge nodes and pod managers (as described above).

In further examples, an Edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an Edge computing system may be configured to fulfill requests and responses for various client endpoints from multiple virtual Edge instances (and, from a cloud or remote data center). The use of these virtual Edge instances may support multiple tenants and multiple applications (e.g., augmented reality (AR)/virtual reality (VR), enterprise applications, content delivery, gaming, compute offload, etc.) simultaneously. Further, there may be multiple types of applications within the virtual Edge instances (e.g., normal applications; latency sensitive applications; latency-critical applications; user plane applications; networking applications; etc.). The virtual Edge instances may also be spanned across systems of multiple owners at different geographic locations (or, respective computing systems and resources which are co-owned or co-managed by multiple owners).

For instance, each Edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various Edge node resources (e.g., storage, compute, services, depicted with hexagons) provided for the respective Edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, the pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different Edge node that does satisfy it. Alternatively, the first pod may be allowed to execute and a different shared pod controller is installed and invoked prior to the second pod executing.

Figure 5:
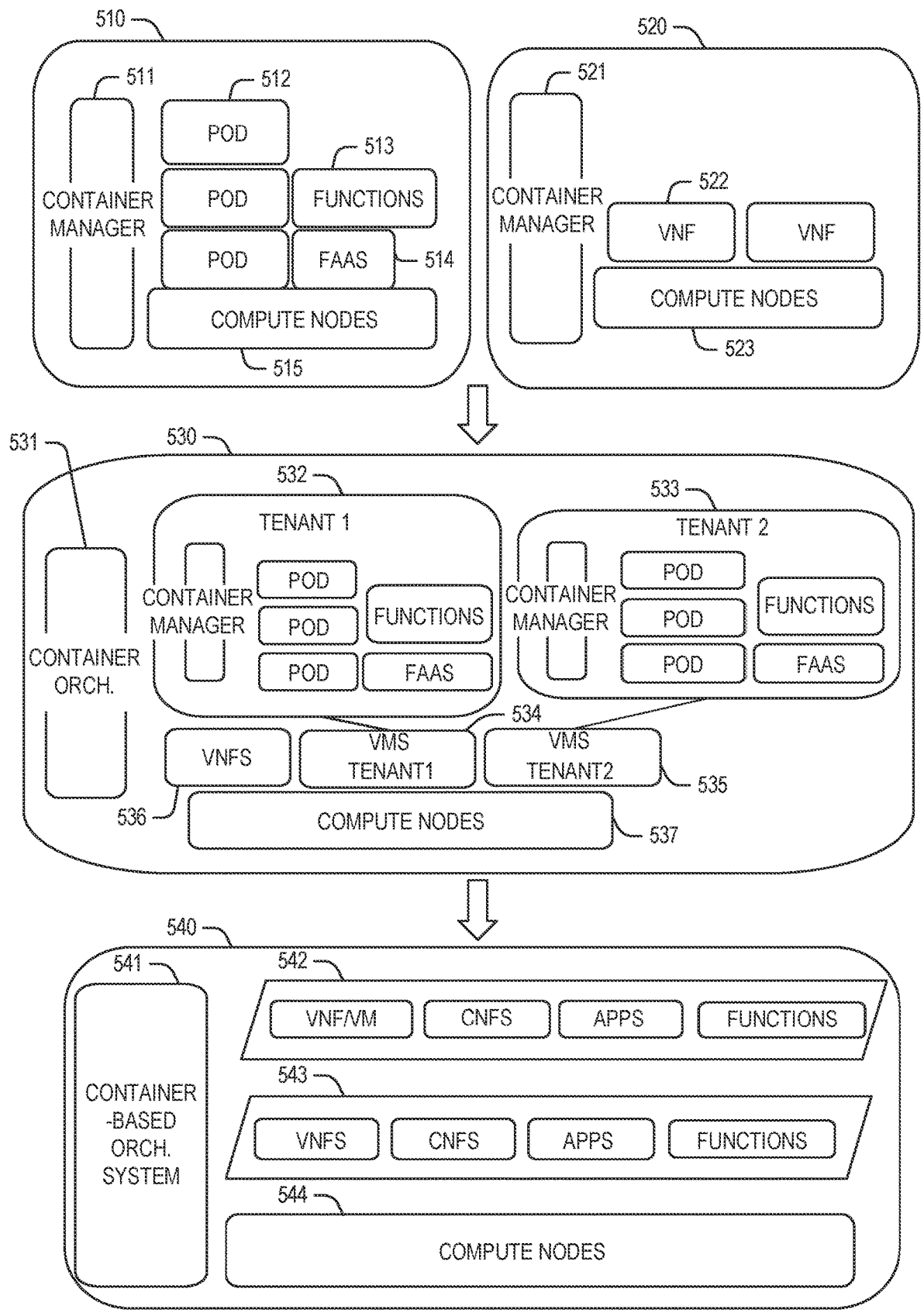
FIG. 5 illustrates various compute arrangements deploying containers in an Edge computing system.

FIG. 5 illustrates additional compute arrangements deploying containers in an Edge computing system. As a simplified example, system arrangements 510, 520 depict settings in which a pod controller (e.g., container managers 511, 521, and container orchestrator 531) is adapted to launch containerized pods, functions, and FaaS instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements depicted in FIG. 5 provide an architecture that treats VMs, Containers, and Functions equally in terms of application composition (and resulting applications are combinations of these three ingredients). Each ingredient may involve use of one or more accelerator (e.g., FPGA, ASIC, etc.) components as a local backend. In this manner, applications can be split across multiple Edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but Edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an Edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Systems and methods disclosed herein may be utilized for analysis of an Edge application as a whole, as well as analysis of any components of an Edge computing system, such as those Edge computing systems illustrated in FIGS. 1-5. For example, an entity (e.g., Edge service provider, Edge application provider, etc.) may utilize examples disclosed herein to launch a scale-out profiler that is capable of aggregating information across multiple Edge nodes and/or Edge geographies to provide an aggregated assessment of compute, memory, usage, etc. to a requester. Examples disclosed herein may be utilized by any number and/or type of entities, such as an analyst entity, an Edge service provider, an Edge network provider, an Edge computing system provider, an Edge application provider, etc. Examples disclosed herein enable a debug capability for the Edge application that may be invaluable to scale-out architecture providers. Examples disclosed herein enable an aggregation of data (e.g., telemetry data, monitoring data, tracing data, etc.) that may be analyzed by the entity to accomplish any number and/or type of goals. For example, the data may be analyzed to determine bottlenecks of code, engage in cause-effect analysis to root cause an issue, identify code hotpots, etc. The analysis of the data may enable the entity to improve resource utilization, reduce Edge node resource waste, improve application execution time, etc.

Figure 6:
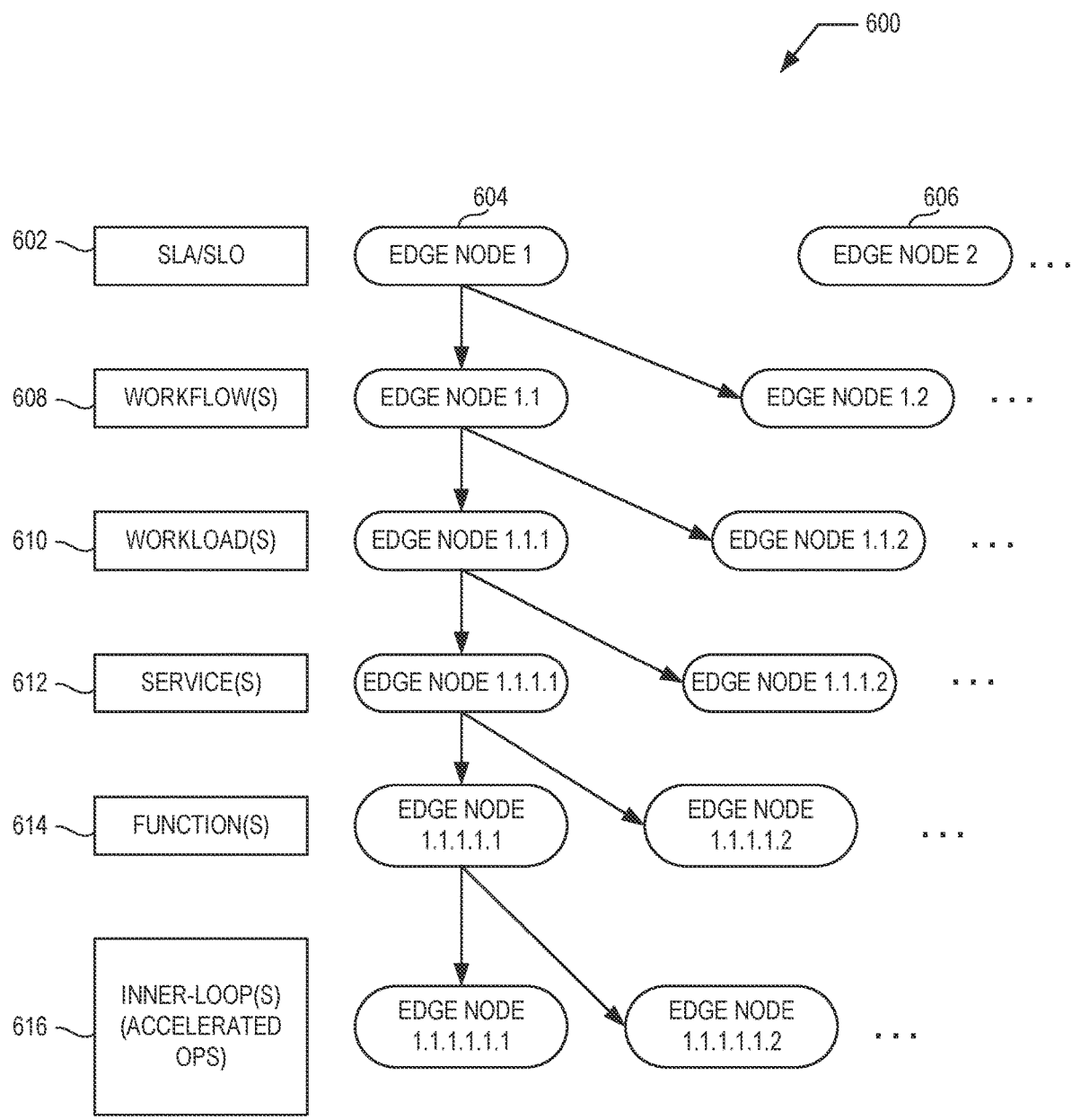
FIG. 6 depicts an example execution plan for an example Edge computing system.

FIG. 6 illustrates an example execution plan 600 for an example Edge computing system, such as those Edge computing systems illustrated in FIGS. 1-5 and 7-8. The example execution plan 600 may be defined by an example SLA and corresponding service level operation (SLO) (e.g., SLA/SLO 602). While the SLA defines the service (e.g., Edge network metrics such as Edge node availability, performance, etc.) provided by an Edge network provider to an entity, an SLO is an agreement within the SLA regarding a metric of specific Edge node, such as response time, etc.

The execution plan 600 of FIG. 6 is an example "fan-out" execution plan 600, which is a common type of Edge execution plan 600 in place today. A "fan-out" execution plan is an execution plan 600 in an Edge computing system in which an element (e.g., a node, a workflow, a workload, etc.) is decomposed into a sub-elements. To decompose as disclosed herein means to separate into parts. For example, decomposing an application includes separating the application into a plurality of elements, such as through the use of microservices. One or more elements can be further decomposed into sub-elements. For example, a workflow can be decomposed into a plurality of workloads. Decomposition allows developers to develop applications into smaller, typically simpler, parts as opposed to developing a large, complex application. The "fan-out" execution plan 600 of FIG. 6 includes multiple Edge nodes, such as example Edge node 1 604 and example Edge node 2 606.

As illustrated in FIG. 6, execution of a component (e.g., a thread, VM, container, etc.) at Node 1 may be decomposed into one or more workflow(s) 608 (e.g., Node 1.1, Node 1.2, etc.). The one or more workflow(s) 608 may involve one or more workload(s) 610 (e.g., Node 1.1.1, Node 1.1.2, etc.). The one or workload(s) 610 may utilize one or more service(s) 612 (e.g., Node 1.1.1.1, Node 1.1.1.2, etc.), each of which may perform one or more function(s) 614 (e.g., Node 1.1.1.1.1, Node 1.1.1.1.2, etc.). The one or more function(s) 614 may be further decomposed into one or more accelerated inner-loop operation(s) 616 (e.g., Node 1.1.1.1.1.1, Node 1.1.1.1.1.2, etc.). Each decomposition is an opportunity for distribution and scheduling on a different Edge Node hosting environment (e.g., a server, router, switch, etc.).

An Edge service provider may need to schedule a service for an Edge entity (e.g., a CSP, etc.), which may traverse multiple of Edge nodes and Edge geographies. Scheduling the service (e.g., an Edge application) across the various Edge nodes is a complex task, which may necessitate several actions by the service provider. Such actions may be taken to ensure an object of the service safely and securely crosses an Edge node compute boundary. Such actions may include (1) discovering an Edge node(s) that will satisfy a target Edge node hosting requirement(s), (2) securely attesting and configuring the Edge node(s), (3) authorizing a use of resources (e.g., compute, process, storage, etc.) for performing the hosting operation as well as securing payment for such use, (4) obtaining a data protection key(s) and securing input/output data (or functions, e.g. named function network (NFN)), (5) provisioning the Edge Node to perform an expected operation and scheduling execution of the operation, (6) securely saving a preliminary result(s) and returning the result to a parent hosting environment (e.g., scheduler), (7) completing an operation(s) that has an intermediate result(s) to generate a tertiary result, etc., and/or (8) accounting for the execution and authorizing remuneration.

For each of the above actions, a scale-out analysis tool must maintain context so that each action can be introspected, stepped through, and/or simulated as part of a debugging process. Context refers to a minimum set of data that must be saved to allow a task to be interrupted and later continued from a same point. For example, an inner-loop operation (e.g., inner-loop operation 616) may be suspect by an Edge application debugging analyst (e.g., perhaps the inner-loop operation returned incorrect results (e.g., data). The analyst may elect to invoke a debug-let that invokes the operation using test data. Meanwhile, the existing inner-loop context may be held (e.g., paged out) while the debug-let runs. Memory paging refers to a memory management technique wherein a computing device stores and/or retrieves data from a secondary storage for use in main memory. Accordingly, paging out a context means to store the context (e.g., minimum set of data) at a point of interruption to be retrieved at a later point. Examples disclosed herein enable a debug-let tool for an Edge application. In some examples, the debug-let tool is sophisticated and may include workflow-lets, workload-lets, service-lets, function-lets, inner-loop-lets etc. such that an entire distributed execution plan can be performed using sample data (which may or may not include of actual user data—as needed to reproduce and simulate the offending behaviors).

Figure 7:
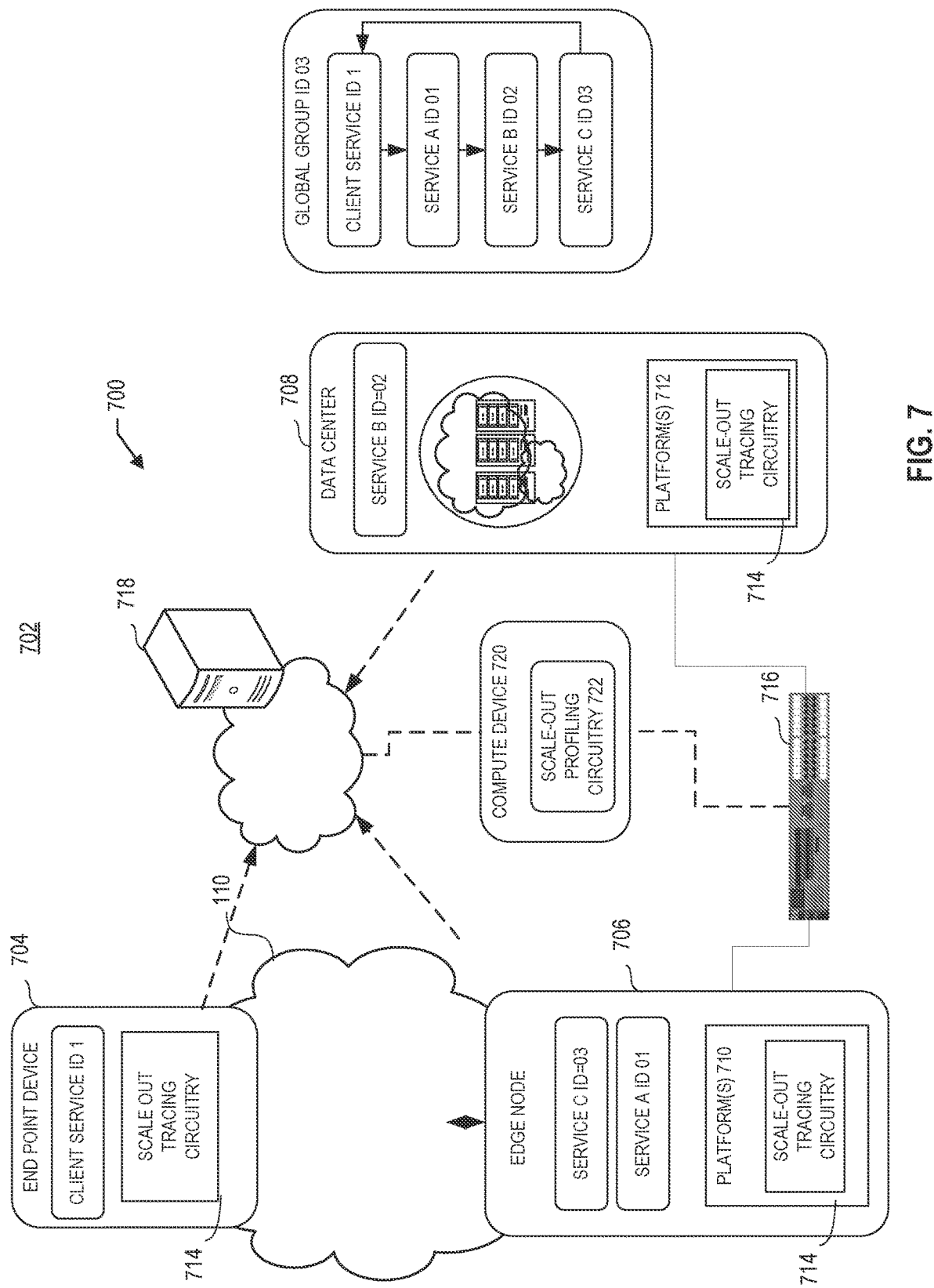
FIG. 7 illustrates an example Edge networking environment including an example tracing system for an example Edge computing system structured in accordance with the teachings disclosed herein.

FIG. 7 illustrates an example environment including an example tracing system 700 for an example Edge computing system 702 that enables end-to-end tracing capabilities for an Edge application in accordance with the teachings of this disclosure. The example Edge computing system 702 may be utilized by an Edge entity (e.g., an Edge service provider, an Edge application provider, etc.) to provide an Edge service (e.g., an Edge application, an IoT service, an IoT function, etc.) for a client via an end point device (e.g., user equipment, internet of things device, client endpoint, etc.). The Edge computing system 702 of FIG. 7 includes a plurality of Edge devices, including an example Edge end point device 704 (e.g., end point device), an example Edge node 706, and an example Edge data center 708. The Edge computing system 702 may additionally or alternatively include devices and/or Edge nodes not illustrated in FIG. 7, such as individual entities, nodes, and/or or subsystems that include discrete and/or or connected hardware and/or software configurations to facilitate or use an Edge cloud (e.g., Edge cloud 110 of FIGS. 1-3) of the Edge computing system 702.

The example end point device 704 may be any suitable end point device, such as personal computing device (e.g., laptop, smart phone, etc.), an IoT device, etc. The end point device 704 defines a platform (including hardware and software), which may be utilized by the client (e.g., a person, a business, etc.) to make the most of the Edge service provided by the Edge entity via an Edge network of the Edge computing system 702. The example Edge node 706, which is part of the Edge cloud 110, provides a compute capability and facilitates a path of the Edge computing system 702. In the illustrated example of FIG. 7, the Edge node 706 is a street cabinet. However, the Edge node 706 may be any suitable Edge node device, such as an Edge node described herein (e.g., a server, router, switch etc.). The Edge node 706 includes at least one example platform(s) 710 (e.g., operating system (OS), computing platform, cloud platform, etc.), which may include any number of example device(s) (e.g., hardware such as processing circuitry, memory, storage, etc.). In the illustrated example of FIG. 7, the example data center 708 is an Edge data center. However, the data center 708 may additionally or alternatively may be any suitable data center that is capable of compute, memory, and storage, such as a cloud data center, core network data center, etc. The data center 708 includes at least one example platform(s) 712 (e.g., operating system (OS), computing platform, cloud platform, etc.), which may include any number of example device(s) (e.g., hardware such as processing circuitry, memory, storage, etc.).

The example tracing system 700 of FIG. 7 (including the tracing capability provided therein) enables an Edge entity to analyze the Edge service operating in the Edge computing system 702. For example, the tracing system 700 enables analysis, such as Edge application profiling, debugging capabilities, resource alignment, etc. by monitoring the Edge service from request to response, including all processes that execute along the way. Accordingly, the example tracing system 700 of FIG. 7 includes example scale-out tracing circuitry 714 that enables the end-to-end tracing of the Edge service as it traverses various Edge devices of the Edge computing system 702. In the illustrated example of FIG. 7, the tracing system 700 also includes an example monitoring device 716, an example tracing server 718, and an example compute device 720 having example scale-out profiling circuitry 722.

The Edge devices of the Edge computing system 702 (e.g., the endpoint device 704, Edge node 706, the data center 708, etc.) each include the example scale-out tracing circuitry 714, which is structured to generate tracing data that enables tracing of the Edge service as it traverses the Edge computing system 702. For example, the scale-out tracing circuitry 714 is structured to monitor a process executing on (e.g., or within) the Edge device 704, 706, 708 to generate (e.g., collect, manage, etc.) monitoring data (e.g., telemetry data, counters, etc.) corresponding to an example global group identifier (GGID) and to process the monitoring data to generate tracing data. The GGID is an identifier for a specific entity, such as an Edge application, Edge service, enterprise entity, etc., that facilitates tracing of the Edge service across the Edge computing system 702. The GGID is allows the tracing system 700 to correlate the global entity (e.g., the Edge application, the Edge service), which includes of multiple services (e.g., microservices), with the local service that is running on the Edge device 704, 706, 708. The scale-out tracing circuitry 714 may be executed by processing circuitry within the Edge device 704, 706, 708.

In the illustrated example of FIG. 7, the tracing system 700 includes the example monitoring device 716. The monitoring device 716 is a recording device structured to track a function, condition, operation, etc. corresponding to a device(s) within the Edge computing system 702. The monitoring device 716 is structured to receive and store data (e.g., telemetry data, monitoring data, etc.) generated by an Edge device 704, 706, 708 of the Edge computing system 702. In the illustrated example of FIG. 7, the monitoring device 716 is an infrastructure processing unit (IPU). However, the monitoring device 716 may be any suitable monitoring unit, such as performance management unit (PMU), etc.

The scale-out tracing circuitry 714 collects and manages monitoring data such as performance counters, telemetry, etc. corresponding to a process belonging to a GGID. In the illustrated example of FIG. 7, the scale-out tracing circuitry 714 collects monitoring data associated with the process that is generated by the example monitoring device 716, which is communicatively coupled to the device 704, 706, 708. In some examples, the scale-out tracing circuitry 714 monitors the device 704, 706, 708 while the device 704, 706, 708 executes a process to generate monitoring data associated with the process. In some examples, the scale-out tracing circuitry 714 collects monitoring data associated with the process that is monitored by circuitry within the device 704, 706, 708. In some examples, the monitoring data is generated using an existing interface within a hardware component of the device 704, 706, 708 and/or the monitoring device 716. In additional or alternative examples, mechanisms may be introduced into the device 704, 706, 708 and/or the monitoring device 716 to collect additional or alternative data for the specific Edge hosting environment.

Examples disclosed below are configured such that the monitoring device 716 generates the monitoring data using an existing interface. When executing a process, the Edge device 704, 706, 708 attaches a process identifier (e.g., a process access space identifier (PASID), process identifier (PID), etc., herein referred to as a process ID) to data monitored within the Edge device 704, 706, 708. The process ID is a unique ID (e.g., number) that identifies a process running on a platform (e.g., a platform of the device). Until the process terminates, the process ID uniquely identifies the process as it executes throughout the platform. Each process of a service (e.g., the Edge service) that runs on the platform receives a process ID. The monitoring data generated during the execution of the process includes the attached process ID.

The scale-out-tracing circuitry 714 facilitates end-to-end tracing of the service as it traverses various Edge devices of the Edge computing system 702 by utilizing the GGID and various process IDs when generating tracing data (e.g., telemetry data, process monitoring data, etc.) within each of the different elements in all the Edge tiers and involved network resources (e.g., platform(s), device(s), switch(es), router(s), etc.). The GGID is used to associate (e.g., index, map, etc.) monitoring data generated by the monitoring device(s) 716 during execution of the service(s) (e.g., process, etc.) on the Edge device(s) 704, 706, 708—as well as communications between those processes and Edge device(s) 704, 706, 708—to generate tracing data. During a lifetime of a set of processes logically belonging to the same workflow (e.g., from the endpoint device 704 to the end service generating the result for the device), the scale-out tracing circuitry 714 is structured to collect monitoring data associated with a corresponding process ID and to process the monitoring data to generate tracing data. For example, processing the monitoring data may include mapping the process ID to the respective GGID, coordinating a timestamp of telemetry data for a particular GGID using Network Time Protocol (NTP), etc. In some examples, an Edge resource of the Edge computing system 702, such as a switch, network stream, etc., may attach a resource identifier (e.g., an Edge node identifier, switch identifier, etc.) to the telemetry data. The resource identifier (ID) may be utilized to map events on the resource to the GGID.

In the illustrated example of FIG. 7, the tracing system 700 includes an example tracing server 718. The tracing server 718 is structured to receive (and/or retrieve) and store tracing data generated by the scale-out tracing circuitry 714.

For example, the tracing server 718 may store tracing data for a plurality of GGIDs and corresponding process IDs. In some examples, tracing data stored in the tracing server 718 can be accessed for analysis (e.g., via an interface). For example, an Edge application analyst may retrieve tracing data for a specific GGID from the tracing server 718 to analyze performance of the Edge application corresponding to the GGID. In some examples, the monitoring data may be sent to the tracing server 718 (e.g., to be processed and stored by the tracing server 718). In some examples, the timestamp of the tracing data (and/or monitoring data) is coordinated in the tracing server 718.

In the illustrated example of FIG. 7, the end point device 704 initiates a service provided by an entity, which is associated with a GGID (e.g., Global Group ID 03). The end point device 704 generates (e.g., via the associated platform) and sends a data object (e.g., a request), which includes the GGID, to the Edge node 706. For example, the GGID may be an extension into an IP header, an ethernet header, an application domain header, etc. During generation and sending of the data packet, the end point device 704 generates monitoring data associated with the generation and sending of the data packet. Further, the end point device 704 attaches a process ID (e.g., Client Service ID 1) to the monitoring data (e.g., via an extension into the IP header, the ethernet header, the application domain header, etc.). Depending on the configuration of the scale-out tracing circuitry 714, the end point device 704 sends the monitoring data (including the GGID and process ID) to the monitoring device 716 and/or the tracing server 718 for processing and/or storage.

The Edge node 706 is structured to receive the data packet, including the GGID. In some examples, the Edge node 706 provides a microservice of the service. In some examples, the Edge node 706 simply processes the data packet received from the end point device 704. Upon receiving the data packet having the GGID, the Edge node 706 processes the data packet. During processing of the data packet, the Edge node 706 generates monitoring data associated with the process and attaches a process ID (e.g., Service A ID 01) to the monitoring data. In some examples, the Edge node 706 attaches a resource identifier (e.g., resource ID). The resource ID is a unique identifier (e.g., number) that corresponds to the specific Edge node 706. The resource ID may be used during analysis to determine capabilities specific to the Edge node 706. Depending on the configuration of the scale-out tracing circuitry 714, the Edge node 706 sends the monitoring data (including the GGID, process ID, and resource ID) to the monitoring device 716 and/or the tracing server 718 for storage.

While processing the request, the Edge node 706 in FIG. 7 determines to send a data object, including the GGID, to the data center 708. In some examples, the Edge node 706 may request information (e.g., data, content, etc.) from the data center 708 to provide to the end point device 704. For example, the request from the end point device 704 may have been a request for media streaming content (e.g., from Netflix®). In such an example, the Edge node 706 would process the request from the end point device 704 and in turn, request data from the data center 708. In some examples, the Edge node 706 may provide information (e.g., data, content, etc.) to the data center 708. In some examples, the Edge node 706 provides a request, including data, to the data center 708 for the data center 708 to process the data and return a result of the process.

The data center 708 is structured to receive the data object, including the GGID, and to process the data object. The center 708 (e.g., via a device and/or platform of the data center) attaches a process ID (e.g., Service B ID 02). During processing of the data object, the data center 708 generates monitoring data associated with the process, attaches Service B ID 02 to the monitoring data. In some examples the device at the data center 708 attached a resource ID specific to that device to the monitoring data. Depending on the configuration of the scale-out tracing circuitry 714, the device at the data center 708 sends the monitoring data (including the GGID, process ID, and resource ID) to the monitoring device 716 and/or the tracing server 718 for storage.

While processing the data object, the data center 708 determines to send a data object (e.g., a response), including the GGID, to the Edge node 706. Accordingly, the Edge node 706 receives the response, processes the response, attaches a processing ID (e.g., Service C ID 03) to the process, monitors the process to generate monitoring data, attaches a process ID and the resource ID to the monitoring data, and, depending on the configuration of the scale-out tracing circuitry 714, sends the monitoring data to the monitoring device 716 and/or the tracing server 718 for storage. In some examples, the service may include sending a data object (such as the response from the data center) back to the end point device 704 to complete a workflow initiated by the end point device 704 via the request.

In the illustrated example of FIG. 7, the tracing system 700 includes example scale-out profiling circuitry 722, which is structured to facilitate profiling of the Edge service operating within the Edge computing system 702 by utilizing the tracing data generated by the scale-out tracing circuitry 714. For example, the scale-out profiling circuitry 722 may retrieve tracing data (e.g., via the monitoring device 716 and/or the tracing server 718) corresponding to a specific GGID. The tracing data may be used during analysis of the Edge service to generate insights about performance of the Edge service, etc. For example, the tracing data may be used by an AI/ML analysis system (e.g., an AI/ML model) to analyze the Edge service. The tracing data may be input into the AI/ML model to determine performance bottlenecks (e.g., hotspots), generate debugging recommendations, determine Edge nodes that could benefit from tuning, etc.

The example compute device 720 is used to execute the scale-out profiling circuitry 722. The compute device 720 may be any suitable device capable of inputting, processing, storing, and outputting information. For example, the compute device 720 may be any end point device, Edge node, etc. described herein. The scale-out profiling circuitry 722 is executed by processing circuitry within the compute device 720. In some examples, the compute device 720 is a component of the Edge computing system 702. In some examples, the compute device 720 is separate from the Edge computing system 702.

In further examples, any of the compute nodes or devices discussed with reference to the present Edge computing systems and environment may be fulfilled based on the components depicted in FIGS. 8, 9, and 10. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8:
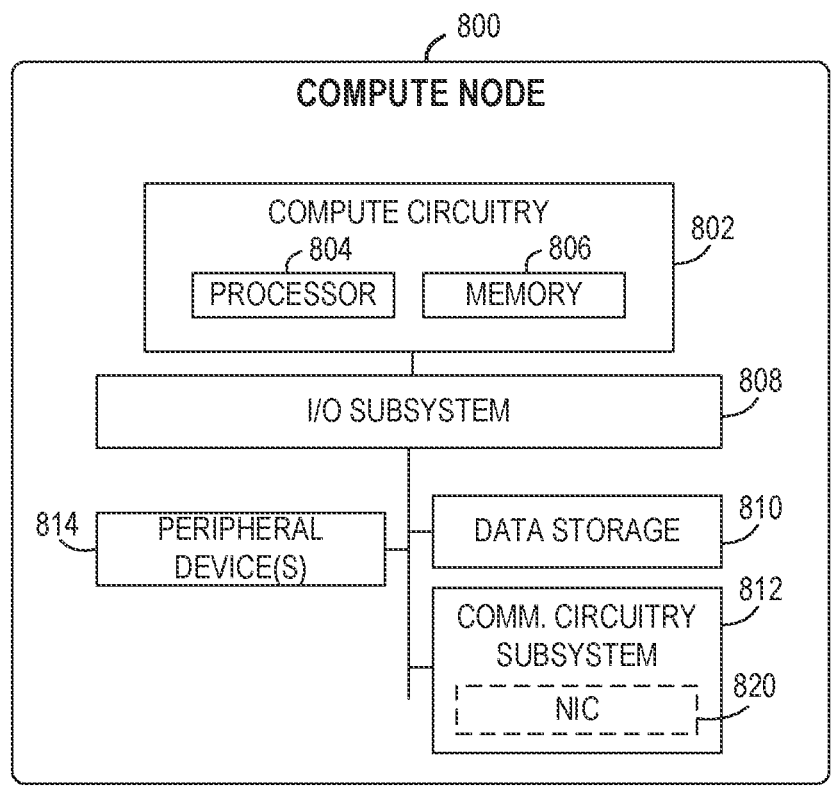
FIG. 8 provides an overview of example components for compute deployed at a compute node in an Edge computing system.

In the simplified example depicted in FIG. 8, an Edge compute node 800 includes a compute engine (also referred to herein as "compute circuitry") 802, an input/output (I/O) subsystem (also referred to herein as "I/O circuitry") 808, data storage (also referred to herein as "data storage circuitry") 810, a communication circuitry subsystem 812, and, optionally, one or more peripheral devices (also referred to herein as "peripheral device circuitry") 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor (also referred to herein as "processor circuitry") 804 and a memory (also referred to herein as "memory circuitry") 806. The processor 804 may be embodied as any type of processor(s) capable of performing the functions described herein (e.g., executing an application). For example, the processor 804 may be embodied as a multi-core processor(s), a microcontroller, a processing unit, a specialized or special purpose processing unit, or other processor or processing/controlling circuit.

In some examples, the processor 804 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 and/or the main memory 806) and other components of the compute circuitry 802. For example, the I/O subsystem 808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

The one or more illustrative data storage devices/disks 810 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 810 may include a system partition that stores data and firmware code for the data storage device/disk 810. Individual data storage devices/disks 810 may also include one or more operating system partitions that store data files and executables for operating systems depending on, for example, the type of compute node 800.

The communication circuitry 812 may be embodied as any communication circuit, device, or collection thereof, capable of enabling communications over a network between the compute circuitry 802 and another compute device (e.g., an Edge gateway of an implementing Edge computing system). The communication circuitry 812 may be configured to use any one or more communication technology (e.g., wired or wireless communications) and associated protocols (e.g., a cellular networking protocol such as a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., an Edge gateway node). In some examples, the NIC 820 may be embodied as part of a system-on-a-chip (SoC) that includes one or more processors, or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or alternatively, in such examples, the local memory of the NIC 820 may be integrated into one or more components of the client compute node at the board level, socket level, chip level, and/or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective Edge compute node (whether a client, gateway, or aggregation node) in an Edge computing system or like forms of appliances, computers, subsystems, circuitry, or other components.

Figure 9:
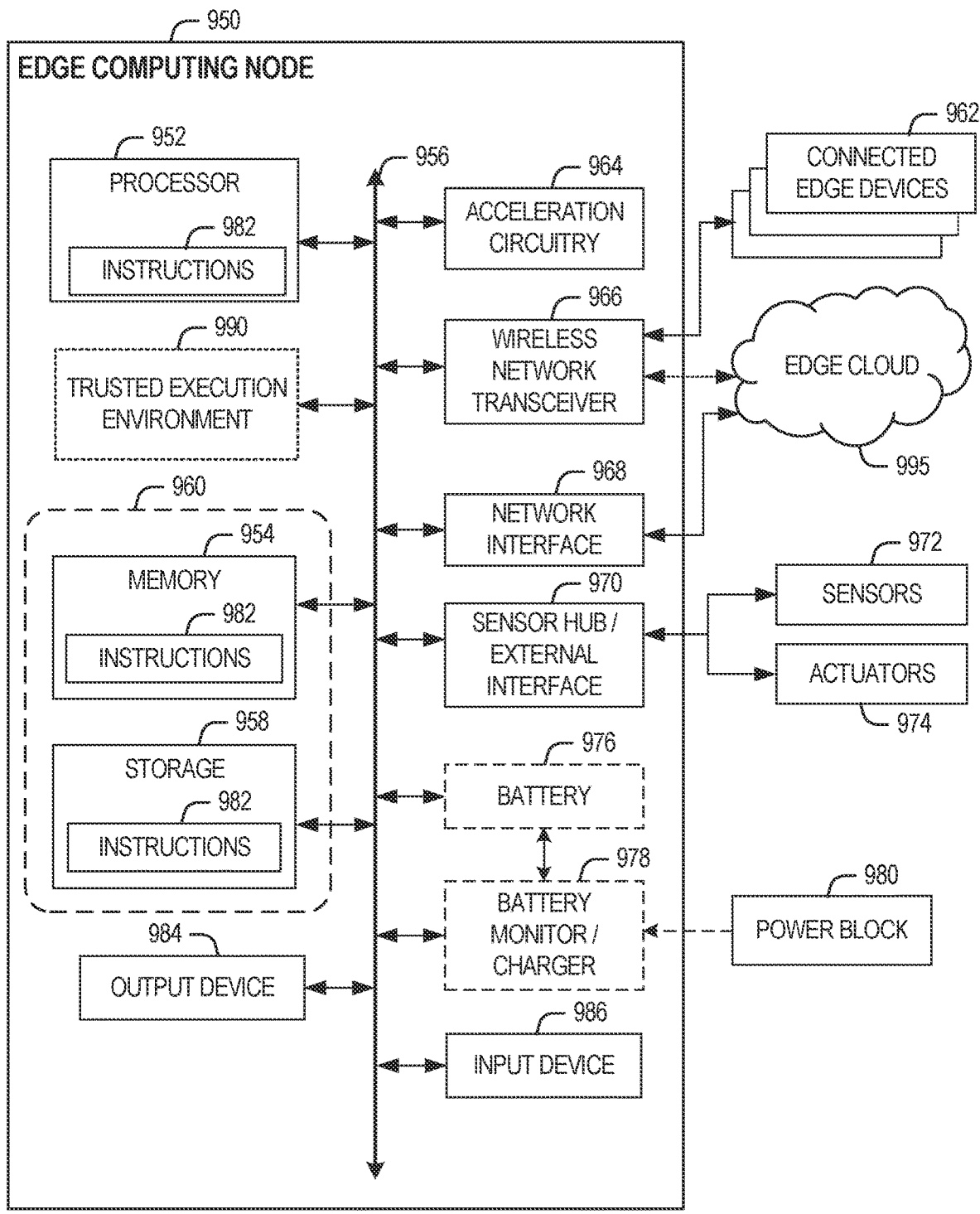
FIG. 9 provides a further overview of example components within a computing device in an Edge computing system.

In a more detailed example, FIG. 9 illustrates a block diagram of an example of components that may be present in an Edge computing node 950 for implementing the techniques (e.g., operations, processes, methods, and methodologies) described herein. This Edge computing node 950 provides a closer view of the respective components of node 800 when implemented as or as part of a computing device (e.g., as a mobile device, a base station, server, gateway, etc.). The Edge computing node 950 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 950, or as components otherwise incorporated within a chassis of a larger system.

The Edge computing device 950 may include processing circuitry in the form of a processor 952, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 952 may be a part of a system on a chip (SoC) in which the processor 952 and other components are formed into a single integrated circuit, or a single package, such as the Edison™ or Galileo™ SoC boards from Intel Corporation, Santa Clara, Calif. As an example, the processor 952 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 952 and accompanying circuitry may be provided in a single socket form factor, multiple socket form factor, or a variety of other formats, including in limited hardware configurations or configurations that include fewer than all elements shown in FIG. 9.

The processor 952 may communicate with a system memory 954 over an interconnect 956 (e.g., a bus). Any number of memory devices may be used to provide for a given amount of system memory. As examples, the memory 954 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example, the storage 958 may be implemented via a solid-state disk drive (SSDD). Other devices that may be used for the storage 958 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 956 may couple the processor 952 to a transceiver 966, for communications with the connected Edge devices 962. The transceiver 966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 966 (or multiple transceivers) may communicate using multiple standards or radios for communications at a different range. For example, the Edge computing node 950 may communicate with close devices, e.g., within about 10 meters, using a local transceiver based on Bluetooth Low Energy (BLE), or another low power radio, to save power. More distant connected Edge devices 962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 966 (e.g., a radio transceiver) may be included to communicate with devices or services in a cloud (e.g., an Edge cloud 995) via local or wide area network protocols. The wireless network transceiver 966 may be a low-power wide-area (LPWA) transceiver that follows the IEEE 802.15.4, or IEEE 802.15.4g standards, among others. The Edge computing node 950 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 966, as described herein. For example, the transceiver 966 may include a cellular transceiver that uses spread spectrum (SPA/SAS) communications for implementing high-speed communications. Further, any number of other protocols may be used, such as Wi-Fi® networks for medium speed communications and provision of network communications. The transceiver 966 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 968 may be included to provide a wired communication to nodes of the Edge cloud 995 or to other devices, such as the connected Edge devices 962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to enable connecting to a second network, for example, a first NIC 968 providing communications to the cloud over Ethernet, and a second NIC 968 providing communications to other devices over another type of network.

Given the variety of types of applicable communications from the device to another component or network, applicable communications circuitry used by the device may include or be embodied by any one or more of components 964, 966, 968, or 970. Accordingly, in various examples, applicable means for communicating (e.g., receiving, transmitting, etc.) may be embodied by such communications circuitry.

The Edge computing node 950 may include or be coupled to acceleration circuitry 964, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 956 may couple the processor 952 to a sensor hub or external interface 970 that is used to connect additional devices or subsystems. The devices may include sensors 972, such as accelerometers, level sensors, flow sensors, optical light sensors, camera sensors, temperature sensors, global navigation system (e.g., GPS) sensors, pressure sensors, barometric pressure sensors, and the like. The hub or interface 970 further may be used to connect the Edge computing node 950 to actuators 974, such as power switches, valve actuators, an audible sound generator, a visual warning device, and the like.

In some optional examples, various input/output (I/O) devices may be present within or connected to, the Edge computing node 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 950. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 976 may power the Edge computing node 950, although, in examples in which the Edge computing node 950 is mounted in a fixed location, it may have a power supply coupled to an electrical grid, or the battery may be used as a backup or for temporary capabilities. The battery 976 may be a lithium ion battery, or a metal-air battery, such as a zinc-air battery, an aluminum-air battery, a lithium-air battery, and the like.

A battery monitor/charger 978 may be included in the Edge computing node 950 to track the state of charge (SoCh) of the battery 976, if included. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) converter that enables the processor 952 to directly monitor the voltage of the battery 976 or the current flow from the battery 976. The battery parameters may be used to determine actions that the Edge computing node 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the Edge computing node 950. A wireless battery charging circuit, such as an LTC4020 chip from Linear Technologies of Milpitas, Calif., among others, may be included in the battery monitor/charger 978. The specific charging circuits may be selected based on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine-readable medium 960 including code to direct the processor 952 to perform electronic operations in the Edge computing node 950. The processor 952 may access the non-transitory, machine-readable medium 960 over the interconnect 956. For instance, the non-transitory, machine-readable medium 960 may be embodied by devices described for the storage 958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 960 may include instructions to direct the processor 952 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 982 on the processor 952 (separately, or in combination with the instructions 982 of the machine readable medium 960) may configure execution or operation of a trusted execution environment (TEE) 990. In an example, the TEE 990 operates as a protected area accessible to the processor 952 for secure execution of instructions and secure access to data. Various implementations of the TEE 990, and an accompanying secure area in the processor 952 or the memory 954 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 950 through the TEE 990 and the processor 952.

While the illustrated examples of FIG. 8 and FIG. 9 include example components for a compute node and a computing device, respectively, examples disclosed herein are not limited thereto. As used herein, a "computer" may include some or all of the example components of FIGS. 8 and/or 9 in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 8 and/or 9, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 8 and/or 9 to satisfy functional objectives of distributed computing tasks. In some examples, the term "compute node" or "computer" only includes the example processor 804, memory 806 and I/O subsystem 808 of FIG. 8. In some examples, one or more objective functions of a distributed computing task(s) rely on one or more alternate devices/structure located in different parts of an Edge networking environment, such as devices to accommodate data storage (e.g., the example data storage 810), input/output capabilities (e.g., the example peripheral device(s) 814), and/or network communication capabilities (e.g., the example NIC 820).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 8 and 9, such computers satisfy execution of distributed computing objective functions without including computing structure that would otherwise be unused and/or underutilized. As such, the term "computer" as used herein includes any combination of structure of FIGS. 8 and/or 9 that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 8 and 9, computing devices include operating systems. As used herein, an "operating system" is software to control example computing devices, such as the example Edge compute node 800 of FIG. 8 and/or the example Edge compute node 950 of FIG. 9. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

Figure 10:
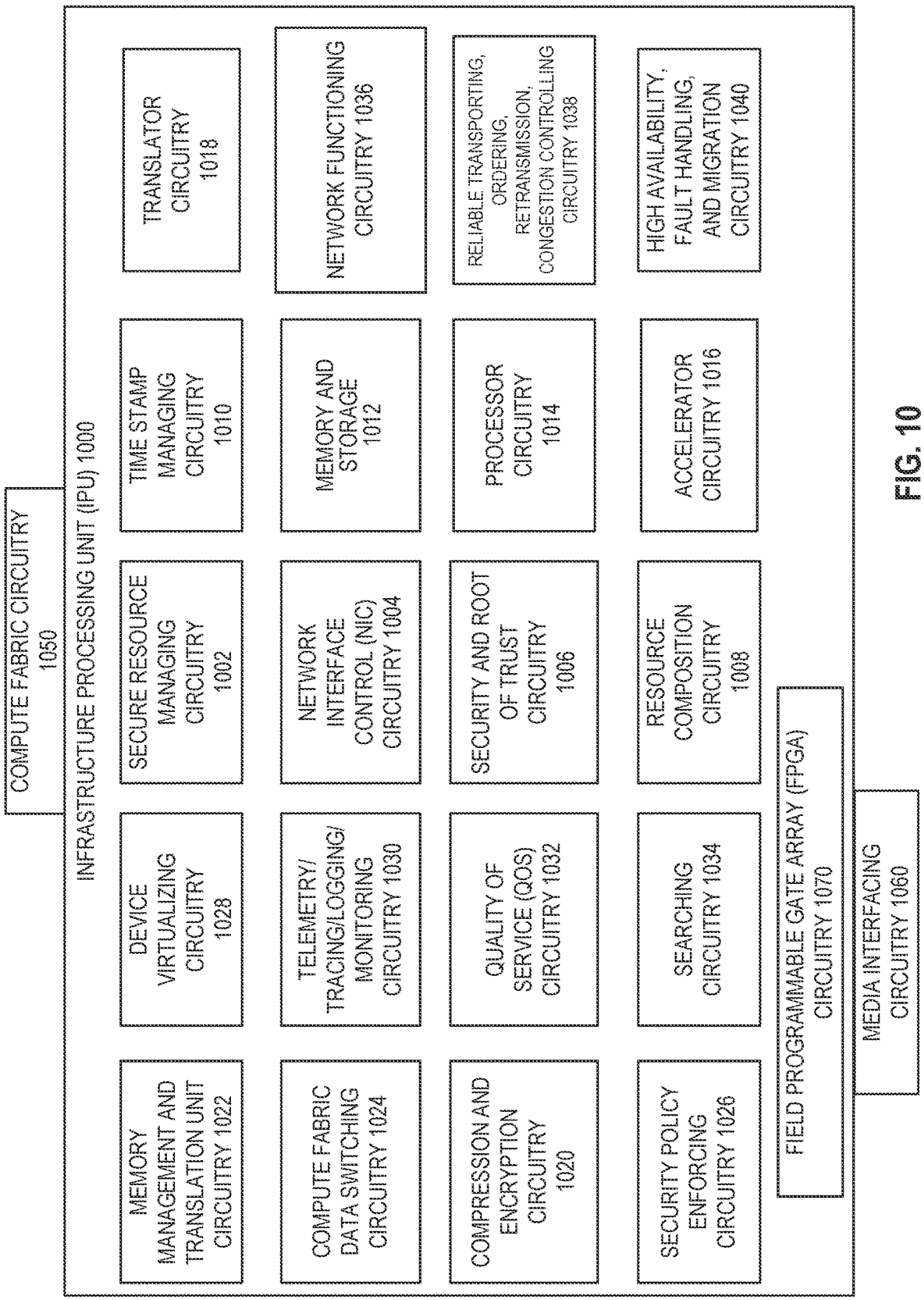
FIG. 10 is a schematic diagram of an example infrastructure processing unit (IPU).

FIG. 10 depicts an example of an infrastructure processing unit (IPU). Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 10, the IPU 1000 includes or otherwise accesses secure resource managing circuitry 1002, network interface controller (NIC) circuitry 1004, security and root of trust circuitry 1006, resource composition circuitry 1008, time stamp managing circuitry 1010, memory and storage 1012, processing circuitry 1014, accelerator circuitry 1016, and/or translator circuitry 1018. Any number and/or combination of other structure(s) can be used such as but not limited to compression and encryption circuitry 1020, memory management and translation unit circuitry 1022, compute fabric data switching circuitry 1024, security policy enforcing circuitry 1026, device virtualizing circuitry 1028, telemetry, tracing, logging and monitoring circuitry 1030, quality of service circuitry 1032, searching circuitry 1034, network functioning circuitry (e.g., routing, firewall, load balancing, network address translating (NAT), etc.) 1036, reliable transporting, ordering, retransmission, congestion controlling circuitry 1038, and high availability, fault handling and migration circuitry 1040 shown in FIG. 10. Different examples can use one or more structures (components) of the example IPU 1000 together or separately. For example, compression and encryption circuitry 1020 can be used as a separate service or chained as part of a data flow with vSwitch and packet encryption.

In some examples, IPU 1000 includes a field programmable gate array (FPGA) 1070 structured to receive commands from an CPU, XPU, or application via an API and perform commands/tasks on behalf of the CPU, including workload management and offload or accelerator operations. The illustrated example of FIG. 10 may include any number of FPGAs configured and/or otherwise structured to perform any operations of any IPU described herein.

Example compute fabric circuitry 1050 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 1060 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1000, IPU 1000 is a root of a system (e.g., rack of servers or data center) and manages compute resources (e.g., CPU, xPU, storage, memory, other IPUs, and so forth) in the IPU 1000 and outside of the IPU 1000. Different operations of an IPU are described below.

In some examples, the IPU 1000 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 1000 is selected to perform a workload, secure resource managing circuitry 1002 offloads work to a CPU, xPU, or other device and the IPU 1000 accelerates connectivity of distributed runtimes, reduce latency, CPU and increases reliability.

In some examples, secure resource managing circuitry 1002 runs a service mesh to decide what resource is to execute workload, and provide for L7 (application layer) and remote procedure call (RPC) traffic to bypass kernel altogether so that a user space application can communicate directly with the example IPU 1000 (e.g., IPU 1000 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to iSCSI, NVMe-oF, or CXL.

In some cases, the example IPU 1000 dynamically selects itself to run a given workload (e.g., microservice) within a composable infrastructure including an IPU, xPU, CPU, storage, memory, and other devices in a node.

In some examples, communications transit through media interfacing circuitry 1060 of the example IPU 1000 through a NIC/smartNIC (for cross node communications) or loopback back to a local service on the same host. Communications through the example media interfacing circuitry 1060 of the example IPU 1000 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 1000 prioritizes its processing to minimize the stalling of the requesting application. In some examples, the IPU 1000 schedules the prioritized message request issuing the event to execute a SQL query database and the example IPU constructs microservices that issue SQL queries and the queries are sent to the appropriate devices or services.

Figure 11:
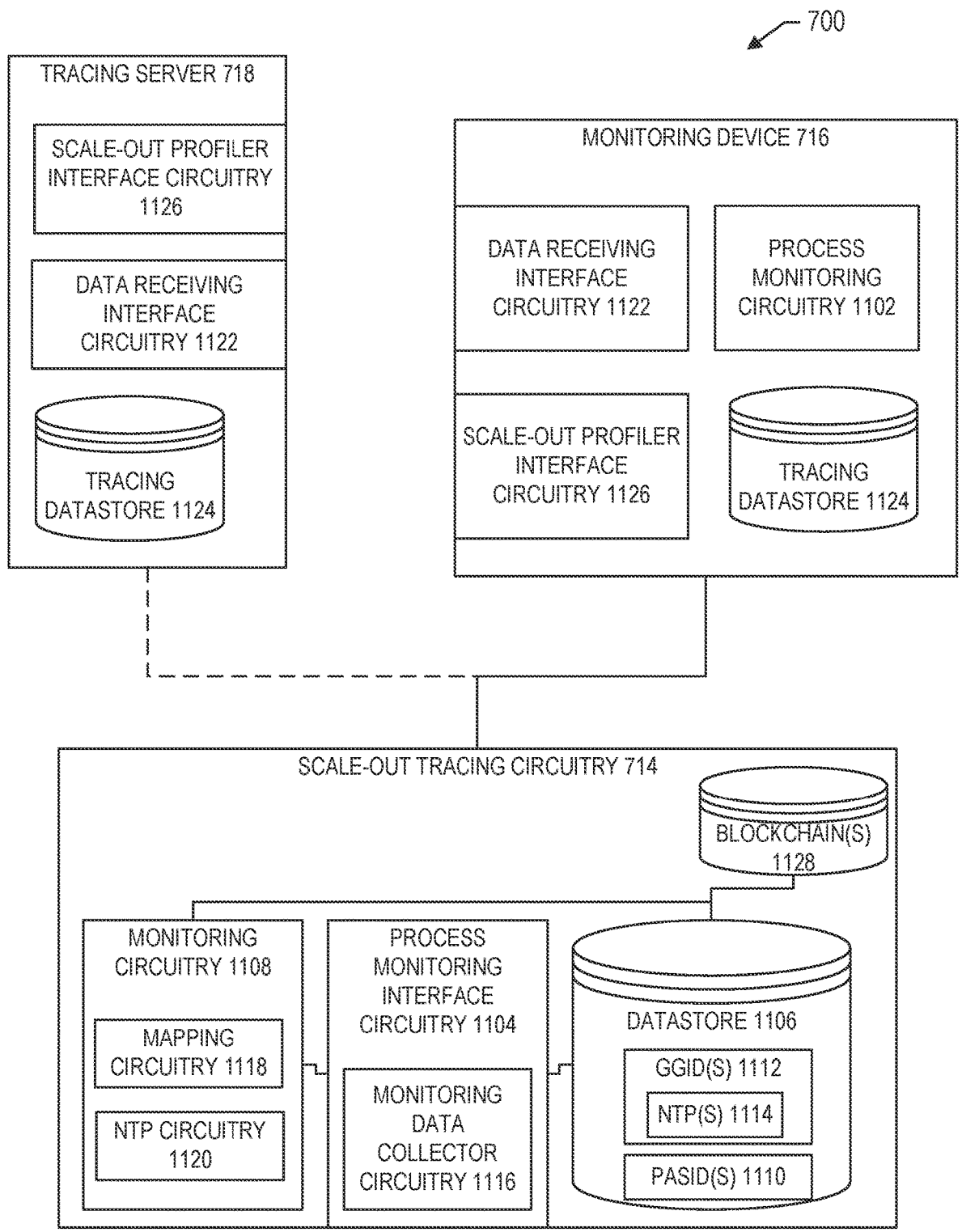
FIG. 11 is a block diagram of the example tracing system of FIG. 7, including example scale-out tracing circuitry for hardware tracing in an Edge computing system structured in accordance with the teachings of this disclosure.

FIG. 11 is a block diagram of the example tracing system 700 of FIG. 7, including the example scale-out tracing circuitry 714 of FIG. 7 to enable end-to-end hardware tracing in an example Edge computing system (e.g., Edge computing system 702 of FIG. 7) in accordance with the teachings of this disclosure. As noted above, the Edge computing system 702 (e.g., including an Edge network, Edge cloud, Edge devices, etc.) attempts to reduce an amount of resources needed for a network service (such as services provided by an Edge application), through the distribution of more resources which are located closer both geographically and in network access time (latency). The result is a distributed computing platform that can span any number of Edge tiers and any number of Edge geographies to facilitate the Edge service. For example, the Edge service may begin at an endpoint device, which accesses the Edge device via the Edge network to conduct data creation, analysis, data consumption, etc. activities.

The Edge computing system 702 is often configured to fulfill requests and responses for any number of client endpoints and/or any number of Edge services (e.g., enterprise applications, content delivery, gaming, compute offload, etc.). Accordingly, the Edge device may support any number of tenants and/or any number of Edge services simultaneously. Further, the Edge service initiated by the endpoint device may traverse any number of Edge devices before being cached. Current technologies fail to provide a mechanism to trace such a service within the Edge computing system 702. Advantageously, the scale-out tracing circuitry 714 enables tracing of the Edge service as it traverses the Edge computing system 702, including tracing and/or collection of data generated at each Edge device along the service's path. During a lifetime of a set of processes logically belonging to the same workflow (e.g., from the endpoint device 704 to the end service generating the result for the device), the scale-out tracing circuitry 714 is structured to collect and process monitoring data (e.g., telemetry, counters, etc. corresponding to execution of a process) to generate tracing data. Tracing data for a specific GGID that includes data for each decomposed micro-service executing on each Edge device during an execution of the Edge service can be aggregated and/or partitioned to analyze performance of the Edge service, debug the Edge computing system 702, etc.

The scale-out tracing circuitry 714 of FIG. 11 may be instantiated (e.g., creating an instance of, bring into being for any length of time, materialize, implement, etc.) by processor circuitry such as a central processing unit executing instructions. Additionally or alternatively, the scale-out tracing circuitry 714 of FIG. 11 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 11 may, thus, be instantiated at the same or different times. Some or all of the circuitry may be instantiated, for example, in one or more threads executing concurrently on hardware and/or in series on hardware. Moreover, in some examples, some or all of the circuitry of FIG. 11 may be implemented by one or more virtual machines and/or containers executing on the microprocessor. The scale-out tracing circuitry 714 may be integrated into an Edge device(s) of an Edge computing system 702, such as any Edge device disclosed herein. In some examples, the scale-out tracing circuitry 714 is structured the same for each Edge device within the Edge computing system 702. In some examples, the scale-out tracing circuitry 714 may vary across Edge devices within the Edge computing system 702. In some examples, the scale-out tracing circuitry 714 is implemented via executable instructions executed by on one or more processors of the Edge device. For example, the scale-out tracing circuitry 714 may be implemented by processing circuitry (e.g., processor 804 of FIG. 8, processor 952 of FIG. 9, processor circuitry 1014 of FIG. 10, etc.) and/or other processors and/or hardware components of the Edge device. In some examples, the scale-out tracing circuitry 714 is implemented by the processing circuitry (e.g., a system of on chip (SOC)).

In the illustrated example of FIG. 11, the scale-out tracing circuitry 714 is communicatively coupled to an example monitoring device (e.g., monitoring device 716 of FIG. 7), such as an IPU, PMU, etc. As noted above, the monitoring device 716 is a recording device structured to track a function, condition, operation, etc. corresponding to the Edge device. In additional or alternative examples, the monitoring device 716 may be contained in the scale-out tracing circuitry 714 and/or the Edge device.

The monitoring device 716 includes example process monitoring circuitry 1102, which is structured to monitor the Edge device during execution of a process to generate monitoring data (e.g., telemetry data, counters, etc.) corresponding to the execution of the process. For example, the monitoring device 716 may generate monitoring data from components of the Edge device, such memory, processing circuitry, etc. during execution of the process. In some examples, the monitoring device 716 is also structured to collect, process, and/or store the monitoring data generated the monitoring device 716 after the monitoring data has been processed by the scale-out tracing circuitry 714.

In some examples, the scale-out tracing circuitry 714 is communicatively coupled to an example scale-out tracing server (e.g., scale out tracing server 718 of FIG. 7). The scale-out tracing server 718 is structured to collect, process, and/or store data generated by the Edge device, such as any end point device, Edge node, data center, etc. described herein. The tracing server 718 enables aggregation of all tracing data (and/or a specific amount of tracing data configured via an interface of the scale-out tracing circuitry 714) for at least one specific global group (e.g., designated via a GGID).

The example scale-out tracing circuitry 714 includes example process monitoring interface circuitry 1104, an example datastore 1106, and example monitoring circuitry 1108. The process monitoring interface circuitry 1104 facilitates the collection and mapping of monitoring data generated by (e.g., via) the monitoring device 716. The process monitoring interface circuitry 1104 is structured to instruct the monitoring device 716 to generate monitoring data for the tracing system 700 for a process belonging to a specific Edge service.

The example datastore 1106 includes a list of example process ID(s) 1110, each of which correspond to a process that executes on the Edge device. That is, the process ID(s) 1110 corresponds to a specific process that executes on the specific Edge device. The datastore 1106 also includes the example GGID(s) 1112, which corresponds to an Edge service that executes a process(es) on the Edge device. While a process ID may change depending on the process executing and/or the device the process is executing on, the GGID 1112 is the same across the Edge computing system 702. The GGID is used to trace the Edge service and is attached to any data generated by the tracing system 700. The example GGID(s) 1112 includes example Network Time Protocol (NTP) 1114 information associated with the respective GGID 1112. The NTP 1114 is a networking protocol for clock synchronization between Edge devices of the Edge computing system 702. The NTP 1114 is used during processing of the monitoring data to ensure an accurate (e.g., desired, consistent) timestamp is associated with the tracing data generated for the GGID 1112. The list of process IDs 1110, the GGID(s) 1112, and/or the NTP(s) 1114 may be modified via the process monitoring interface circuitry 1104.

The example datastore 1106 of FIG. 11 is implemented by any memory, storage device and/or storage disc for storing data such as, for example, flash memory, magnetic media, optical media, solid state memory, hard drive(s), thumb drive(s), etc. Furthermore, the data stored in the datastore 1106 may be in any data format such as, for example, binary data, comma delimited data, tab delimited data, structured query language (SQL) structures, etc. While, in the illustrated example, the datastore 1106 is illustrated as a single device, the datastore 1106 and/or any other data storage devices described herein may be implemented by any number and/or type(s) of memories.

The process monitoring interface circuitry 1104 is structured to initiate scale-out tracing/monitoring in response to the Edge device receiving a data object (e.g., a request, data packet, an object, etc.) that includes a GGID 1112. For example, the process monitoring interface circuitry 1104 may examine the data object received at the Edge device to determine whether the data object includes the GGID 1112, indicating that scale-out tracing/monitoring should be instantiated. In response to determining that the data object includes the GGID 1112, the process monitoring interface circuitry 1104 identifies a list of process IDs 1110 for the data object, determines the GGID 1112 of the data object, determines the NTP accuracy demanded for the GGID 1112, and determines whether generated tracing data should be sent to the monitoring device 716 and/or in the tracing server 718. In response to determining that the data object includes the GGID 1112, the process monitoring interface circuitry 1104 instructs the monitoring device 716 to monitor the Edge device as it processes the data object.

The process monitoring interface circuitry 1104 allows the scale-out tracing circuitry 714 to map a process(es) corresponding to a process ID 1110 to a group of monitoring data for a respective example GGID 1112 generated by the monitoring device 716. In other words, the process monitoring interface circuitry 1104 ensures any data object being processed on the Edge device that is associated with a GGID is monitored, mapped with the GGID, and stored so that the Edge service corresponding to the GGID can be traced end-to-end.

The monitoring device 716 monitors the Edge device as it processes the data object. The process, and monitoring data generated therefrom, includes the process ID 1110. In some examples, the monitoring device 716 attaches the process ID to the monitoring data. In some examples, processing circuitry of the Edge device attaches the process ID to the monitoring data. In some examples, defining what performance counters or telemetry to be collected by the process ID is provided by an existing interface of the monitoring device 716. In some examples, the telemetry to be collected by the process ID is determined via the process monitoring interface circuitry 1104.

In some examples, the monitoring device 716 and/or processing circuitry of the Edge device attach a resource ID to the monitoring data. The resource ID is used to identify the specific Edge device of the Edge computing system 702 that executed to process corresponding to the process ID and to determine the processing capabilities of the respective node during analysis of an Edge application. In some examples, the resource ID indicates the compute capabilities of the Edge device. In some examples, the resource ID is utilized to search for/look up the compute capabilities of the Edge device. In some examples, the resource ID is associated with data corresponding to the specific Edge device, such as an amount of cores of the Edge device, a clock speed, etc.

The process monitoring interface circuitry 1104 includes example monitoring data collector circuitry 1116, which is structured to collect monitoring data generated by the monitoring device 716. For example, the monitoring data collector circuitry 1116 received and/or retrieves the monitoring data generated by the monitoring device 716. The monitoring data collector circuitry 1116 inputs the monitoring data into the example monitoring circuitry 1108, which is structured to process the monitoring data generated by the monitoring device 716 to generate tracing data. For example, the monitoring circuitry 1108 of FIG. 11 is tasked with storing the monitoring data and mapping the monitoring data to a corresponding process ID 1110 and respective GGID 1112. Accordingly, the monitoring circuitry 1108 includes example mapping circuitry 1118 and example NTP circuitry 1120.

The example mapping circuitry 1118 is structured to associate monitoring data for a process having a process ID with a corresponding GGID for which the process ID belongs. The mapping circuitry 1118 receives the monitoring data corresponding to the process ID 1110 and maps the monitoring data corresponding to the process ID 1110 to a respective GGID 1112 for which the process was executed. For example, the mapping circuitry 1118 may attach the GGID and the process ID to a header of a data object having the corresponding tracing data that is to be stored. The header would then indicate that the data object is to be stored with other tracing data (and/or other data, such as telemetry data) corresponding to the GGID.

The example NTP circuitry 1120 is utilized to ensure a time stamp associated with tracing data, which corresponds to the process ID and GGID, is a current time stamp of the GGID. The NTP circuitry 1120 guarantees that the time stamps used to trace the Edge service is synchronized across the Edge computing system 702, which may span multiple time zones. Without accurate time stamps of tracing data corresponding to the GGID, cause-effect analysis would be difficult as time-stamps for tracing data logically belonging to the same workflow may be different.

In some examples, the NTP circuitry 1120 includes an interface to an NTP server. In some example, the NTP circuitry 1120 includes logic to synchronize (e.g., adjust, modify, coordinate, tune, etc.) timestamps of tracing data. The NTP circuitry 1120 is structured to coordinate between the multiple Edge devices of the Edge computing system 702 in which a particular GGID has processes running. The NTP circuitry 1120 includes a mapping of list of Edge devices in which the GGID has a process ID and/or Edge devices which may be used by processes belonging to the GGID (e.g., a microservice may use a switch to communicate with another microservice). The NTP circuitry 1120 also includes a mapping of accuracy for each of the GGIDs 1112 that are registered for the Edge device. The NTP circuitry 1120, depending on the accuracy, synchronizes a time of day between the various Edge devices. Each GGID may have different accuracy requirements. Accordingly, different level of NTP accuracy may be used, depending on the GGID.

In the illustrated example of FIG. 11, the NTP circuitry 1120 receives monitoring data that has been mapped and determines a current time stamp for the GGID. For example, the Edge device for which the monitoring data was generated may be in California. Further, the Edge device in California may communicate with another Edge device in Texas during execution of the process. However, the GGID may be based in New York. The NTP circuitry 1120 ensures that the monitoring data generated in California has a time stamp that corresponds to a current time in New York.

The monitoring circuitry 1108 is structured to send the generated tracing data to the to the monitoring device 716 and/or the tracing server 718, depending on a configuration of the scale-out tracing circuitry 714. Accordingly, the monitoring device 716 (and/or the tracing server 718) includes example data receiving interface circuitry 1122, which is structured to communicate with the monitoring circuitry 1108. The data receiving interface circuitry 1122 obtains (e.g., receives and/or retrieves) tracing data from the monitoring circuitry 118. The data receiving interface circuitry 1122 is utilized by platforms (e.g., of Edge devices) of the Edge computing system to push tracing data for a process ID and GGID. In some examples, the data receiving interface circuitry 1122 includes one interface to receive all tracing data generated within the Edge computing system. In some examples, the data receiving interface circuitry 1122 includes more than one interface. For example, the data receiving interface circuitry 1122 may include an interface for each GGID within the Edge computing system or the data receiving interface circuitry 1122 may include multiple interfaces, each of which are associated with a plurality of GGIDs. For example, the data receiving interface circuitry 1122 may include a plurality of interface, each of which are associated with a plurality of GGIDs that correspond to a specific NTP. The data receiving interface circuitry 1122 is based on authentication and security.

The process monitoring circuitry 1102 of the monitoring device 716 is structured to store tracing data generated by the monitoring circuitry 1108 and obtained by the data receiving interface circuitry 1122. The tracing data is indexed with the process ID, GGID, and the correct GGID time stamp. The process monitoring circuitry 1104 is structured to store the tracing data in an example tracing datastore 1124. In some examples, the monitoring circuitry 1108 stores the tracing data in the example tracing datastore 1124 via the data receiving interface circuitry 1122. In some examples, the tracing datastore 1124 includes storage for the tracing data according to a specific GGID and corresponding process IDs. In some examples, the tracing datastore 1124 is in located in the tracing server 718 and/or in the monitoring device 716. In some examples, the tracing datastore 1124 is located in another location that is accessible by the scale-out tracing circuitry 714. In some examples, the tracing datastore 1124 is located in one compute device. In additional or alternative examples, the tracing datastore 1124 is distributed (e.g., split between multiple servers and/or pods).

In the illustrated example of FIGS. 7, 11, and/or 12, the monitoring device 716 and/or the tracing server 718 include example profiler interface circuitry 1126. The example profiler interface circuitry 1126 is structured to enable access to tracing data for a particular GGID (e.g., and corresponding process IDs). For example, the profiler interface circuitry 1126 may enable an example scale-out profiler circuitry, such as scale-out profiler circuitry 722 of FIG. 12, to access tracing data from the tracing datastore 1124. The profiler interface circuitry 1126 is based on authentication and security.

In the illustrated example of FIG. 11, the profiler interface circuitry 1126 is structured using an out-of-band technique. For example, the profiler interface circuitry 1126 is structured via a separate cell-enable communication network. In some examples, the profiler interface circuitry 1126 includes a GGID from whom tracing data is to be returned. In some examples, the profiler interface circuitry 1126 includes a list of process ID(s) to whom tracing data is to be returned.

In some examples, the Edge device(s) 704, 706, 708 of the Edge computing system 702 each include an example blockchain(s) 1128. As noted above, the blockchain 1128 is a distributed database. Rather than storing information in a central location, the blockchain 1128 is copied and spread across the network of computing devices. Accordingly, the blockchain 1128 is information spread across the Edge computing system 702. The blockchain 1128 is synchronized and accessible across the Edge nodes of the Edge computing system 702. The blockchain 1128 may be a public blockchain, a private blockchain, a hybrid blockchain, etc.

The example blockchain 1128 enables generation of a chronological history of transactions in a series of blocks (e.g., a growing list of records). Additions to the blockchain 1128 are recorded in real-time. The example blockchain 1128 of FIG. 11 may be utilized to keep a record of the Edge application as it traverses the Edge computing system 702. For example, a record may be kept corresponding to a specific GGID via the blockchain 1128. Each transaction (e.g., a process executing on the Edge device 704, 706, 708) corresponding to the GGID (e.g., having the GGID in a data packet) may be made record in the blockchain 1128. That is, the tracing data and/or other corresponding information may be added as a block in the blockchain 1128 for the GGID.

In some examples, a granularity level of the blockchain 1128 is different. In some examples, a blockchain 1128 may be created for an endpoint device 704 and a specific GGID. Each time a packet is processed that includes an IP address of the endpoint device 704 and the GGID, a block may be added to the blockchain 1128 that includes corresponding tracing data. In some examples, a blockchain 1128 may be created for a GGID and resource ID. Tracing data generated by the scale-out tracing circuitry 714 having the specific GGID and resource ID may be added as a block to the corresponding blockchain 1128. However, the blockchain 1128 may have any suitable granularity level that facilitates tracing of the Edge application as it traverses Edge nodes in the Edge computing system 702. In some examples, the blockchain 1128 may include forks, such as when multiple processing corresponding to the GGID are executed at one time.

By using the blockchain 1128 to store chronological information corresponding to a GGID, the blockchain 1128 facilitates hardware tracing in the Edge computing system 702 via the Edge application. Accordingly, end-to-end hardware tracing of the Edge application may be accomplished more than one way. The end-to-end hardware tracing may be accomplished by each Edge node generating tracing data and sending storing the tracing data locally, sending the tracing data to a monitoring device 716, and/or sending the tracing data to a tracing datastore 1124. In additional or alternative examples, the end-to-end hardware tracing may be accomplished by adding the tracing data to the blockchain 1128 corresponding to the GGID of the Edge application.

In some examples, the scale-out tracing circuitry 714 includes means for monitoring. For example, the means for monitoring may be implemented by example process monitoring interface circuitry 1104. In some examples, the process monitoring interface circuitry 1104 may be instantiated by processor circuitry such as the example processor circuitry 1612 of FIG. 16. For instance, the process monitoring interface circuitry 1104 may be instantiated by the example general purpose processor circuitry 1700 of FIG. 17 executing machine executable instructions such as that implemented by at least block 1306 of FIG. 13. In some examples, the process monitoring interface circuitry 1104 may be instantiated by hardware logic circuitry, which may be implemented by an ASIC or the FPGA circuitry 1800 of FIG. 18 structured to perform operations corresponding to the machine readable instructions. Additionally or alternatively, the process monitoring interface circuitry 1104 may be instantiated by any other combination of hardware, software, and/or firmware. For example, the process monitoring interface circuitry 1104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the scale-out tracing circuitry 714 includes means for processing monitoring data. For example, the means for processing monitoring data may be implemented by example monitoring circuitry 1108. In some examples, the monitoring circuitry 1108 may be instantiated by processor circuitry such as the example processor circuitry 1612 of FIG. 16. For instance, the monitoring circuitry 1108 may be instantiated by the example general purpose processor circuitry 1700 of FIG. 17 executing machine executable instructions such as that implemented by at least blocks 1308-1316 of FIG. 13 and 1402-1406 of FIG. 14. In some examples, the monitoring circuitry 1108 may be instantiated by hardware logic circuitry, which may be implemented by an ASIC or the FPGA circuitry 1800 of FIG. 18 structured to perform operations corresponding to the machine readable instructions. Additionally or alternatively, the monitoring circuitry 1108 may be instantiated by any other combination of hardware, software, and/or firmware. For example, the monitoring circuitry 1108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 12:
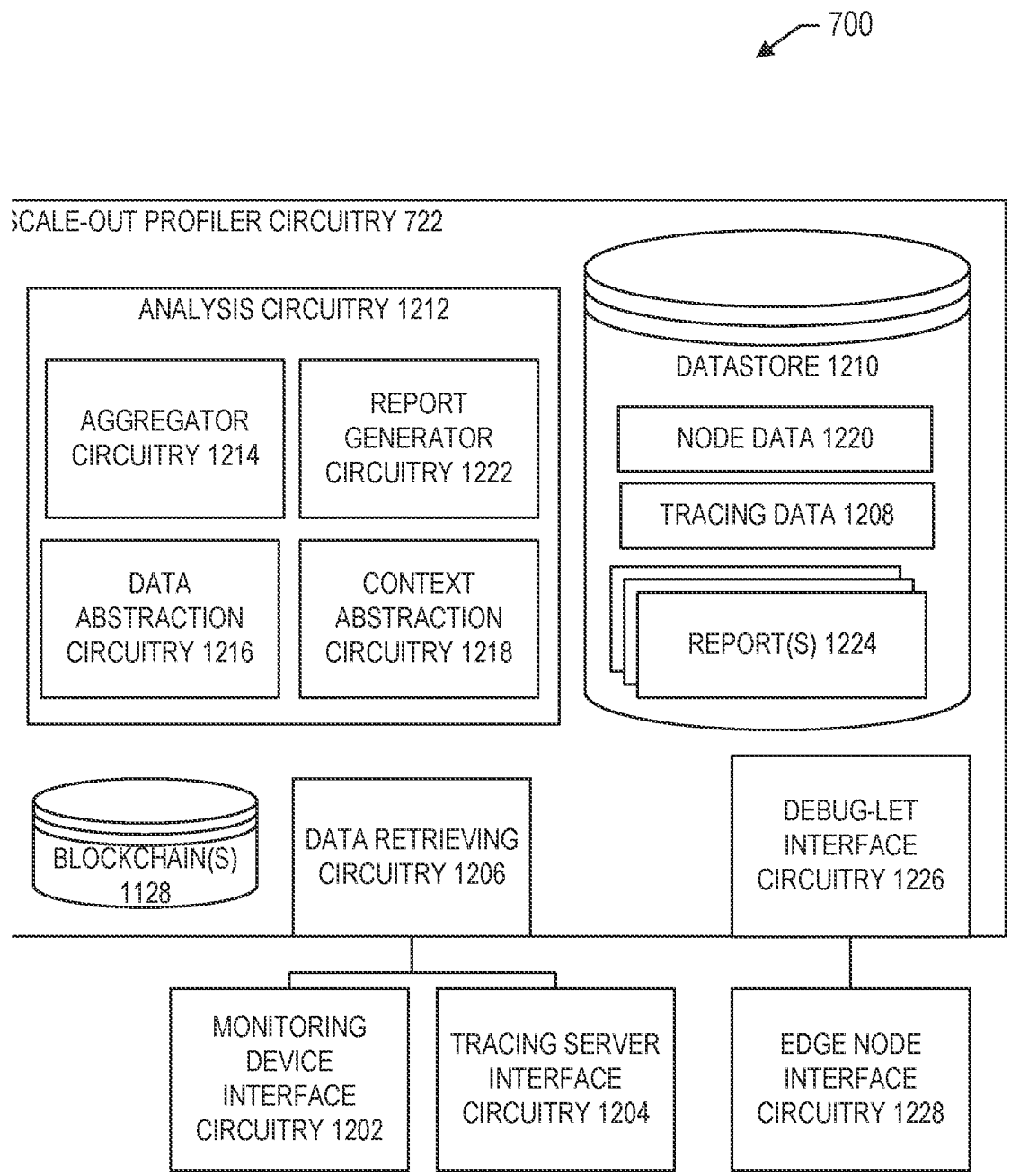
FIG. 12 is a block diagram of the example tracing system of FIG. 7, including example scale-out profiler circuitry for profiling an application in accordance with the teachings of this disclosure.

FIG. 12 is a block diagram of the example scale-out tracing system 700 of FIG. 7, including example scale-out profiler circuitry 722 for profiling an application in accordance with the teachings of this disclosure. The example scale-out tracing circuitry 714 of FIGS. 7 and 11, described above, generates a variety of tracing data that corresponds to a GGID (e.g., GGID 1112). The tracing data for the GGID 1112 may include tracing data for a plurality of processes executing on a plurality of devices across the Edge computing system 702, which may encompass an Edge network that spans any number of locations and/or Edge tiers. The next question is what to do with all the tracing data generated by the scale-out tracing circuitry 714. The example scale-out profiler circuitry 722 is one example of structure that may be utilized to analyze and/or other manage the tracing data. For example, the scale-out profiler circuitry 722 may aggregate the tracing data for the GGID 1112 to analyze an Edge service corresponding to the GGID 1112. In some examples, the scale-out profiler circuitry 722 manages the tracing data to predict failures of the Edge computing system 702 to try to prevent such failures in the future. In some examples, the scale-out profiler circuitry 722 manages the tracing data to optimize performance and/or efficiency of the Edge computing system 702. For example, collection of the tracing data may be used to provide insights into where an entity can attempt to micro-optimize power, performance, etc. of an Edge device(s) within the Edge computing system. In some examples, the scale-out profiler circuitry 722 manages the tracing data to build artificial intelligence (AI) algorithms, machine learning (ML) models, etc. that are trained to sift and/or otherwise parse through the tracing data to look for trends, infer new knowledge, etc. However, it is understood that any suitable combination of hardware, software, and/or firmware may be utilized to implement a scale-out profiler enabled by the scale-out tracing circuitry 714.

The example scale-out profiler circuitry 722 of FIG. 12 is structured to enable profiling of an Edge application, Edge service, etc. using an Edge computing system (e.g., Edge computing system 702 of FIG. 7). Current technologies fail to provide a mechanism for tracing an Edge application across the Edge computing system 702. However, examples disclosed herein have provided an infrastructure to enable such tracing and to generate tracing data for the Edge application. The example scale-out profiler circuitry 722 can utilize the tracing data to profile the Edge application. For example, the scale-out profiler circuitry 722 utilizes the tracing data to determine bottlenecks of code, engage in cause-effect analysis to root cause an issue, identify code hotpots, etc.

In some examples, the scale-out profiler circuitry 722 is communicatively coupled to the example monitoring device interface circuitry 1202. In some examples, the scale-out profiler circuitry 722 is communicatively coupled to tracing server interface circuitry 1204. The monitoring device interface circuitry 1202 and/or the tracing server interface circuitry 1204 is structured to enable the scale-out profiler circuitry 722 to access tracing data from a respective tracing datastore (e.g., tracing datastore 1124). The monitoring device interface circuitry 1202 and/or the tracing server interface circuitry 1204 enable the scale-out profiler circuitry 722 to monitor the Edge service in real time and/or to retrieve a collection of tracing data for a period of time. The scale-out profiler circuitry 722 includes example data retrieving circuitry 1206, which is structured to retrieve data, via the monitoring device interface circuitry 1202 and/or the tracing server interface circuitry 1204, to analyze a service. In the illustrated example of FIG. 12, the data retrieving circuitry 1206 stores obtained example tracing data 1208 in an example datastore 1210.

In the illustrated example of FIG. 12, the scale-out profiler circuitry 722 includes the example blockchain(s) 1128 of FIG. 11. Rather than obtaining tracing data via the monitoring device interface circuitry 1202 and/or the tracing server interface circuitry 1204, the scale-out tracing circuitry may retrieve tracing data via the blockchain 1128. The blockchain 1128 will contain a chronological history of transactions corresponding to a GGID and/or other identifiers (e.g., process ID, resource ID, etc.). Accordingly, an analyzer may utilize information in the blockchain 1128 to analyze the Edge service.

The scale-out profiler circuitry 722 includes the example datastore 1210, which is structured to store information and/or data. The datastore 1210 is implemented by any memory, storage device and/or storage disc for storing data such as, for example, flash memory, magnetic media, optical media, solid state memory, hard drive(s), thumb drive(s), etc. Furthermore, the data stored in the datastore 1210 may be in any data format such as, for example, binary data, comma delimited data, tab delimited data, structured query language (SQL) structures, etc. While, in the illustrated example, the datastore 1210 is illustrated as a single device, the datastore 1210 and/or any other data storage devices described herein may be implemented by any number and/or type(s) of memories.

The scale-out profiler circuitry 722 includes example analysis circuitry 1212, which is structured to analyze the data retrieved by the data retrieving circuitry 1206 to analyze the service. The analysis circuitry 1212 includes example aggregator circuitry 1214, example data abstraction circuitry 1216, example context abstraction circuitry 1218, and example report generator circuitry 1220.

The example aggregator circuitry 1214 is structured to aggregate tracing data for a specific GGID, enabling a holistic view of the service. The aggregator circuitry 1214 receives and/or retrieves tracing data 1208 for a specific GGID. In some examples, the aggregator circuitry 1214 aggregates all tracing data 1208 for the GGID. In some examples, the aggregator circuitry 1214 aggregates tracing data 1209 for the GGID corresponding to a specific period of time (e.g., year(s), month(s), days(s), hour(s), time of day, etc.).

The example data abstraction circuitry 1218 is structured to partition aggregated tracing data according a specific, desired objective, such as according to geographic location, operation, stage of completion, etc. The aggregator circuitry 1214 and the data abstraction circuitry 1218 enable a top-down view of the service with drill-down capabilities.

The aggregator circuitry 1214 and the data abstraction circuitry 1218 may be used in combination to generate valuable insights. In some examples, the aggregator circuitry 1214, the data abstraction circuitry 1216, and/or a combination thereof is sued to analyze and/or debug performance of the Edge application. In some examples, the aggregator circuitry 1214, the data abstraction circuitry 1216, and/or a combination thereof may be used to determine what time periods of a day and/or days of a year in which the Edge application is utilized the most. In some examples, the aggregator circuitry 1214, the data abstraction circuitry 1216, and/or a combination thereof may be used to geographic areas in which the Edge service is initialized most often. In some examples, the aggregator circuitry 1214, the data abstraction circuitry 1216, and/or a combination thereof may be used to determine paths the Edge service tends to take. In some examples, the aggregator circuitry 1214, the data abstraction circuitry 1216, and/or a combination thereof may be used to determine other types of information not disclosed herein, but which can provide insights to an entity, such as the Edge service entity. For example, the aggregator circuitry 1214, the data abstraction circuitry 1216, and/or a combination thereof may be used to generate actionable insights about the Edge service running in the Edge computing system 702.

The example context abstraction circuitry 1218 is structured to analyze the Edge service in light of capabilities of the various nodes in the Edge computing system. As noted above, a resource ID is attached to monitoring data in some example. The resource ID is used to identify the specific Edge device of the Edge computing system 702 that executed a process corresponding to a process ID to determine the processing capabilities of the respective node during analysis of the Edge application. Accordingly, the example datastore 1210 includes example resource data 1222. The resource data 1222 includes a list of resource IDs of the Edge computing system 702 and corresponding capabilities of the Edge device having the resource ID.

Knowing differences in capabilities (differences in compute capability, memory population, core count, etc.) between Edge devices executing process for the Edge application may be useful to an analyst for analysis and/or debugging. For example, a first Edge node may have a faster CPU than a second Edge node. However, knowing that the first Edge node has twice as many cores than the second Edge node may help the analyst determine whether the second Edge node is functioning properly.

The scale-out profiler circuitry 722 includes an example report generator circuitry 1224, which is structured to generate an example report 1224 corresponding to a GGID. For example, the report may include analysis of a service, such as performance analysis, debugging analysis, etc. In some examples, the report 1224 is generated in response to a request for the report 1224 by an Edge application provider, Edge service provider, etc. In some examples, the report 1224 may be generated in response to a request for the report 1224 by an information technology (IT) management company that has been hired to maintain the Edge computing system 702. In the illustrated example of FIG. 12, the report 1224 is stored in the datastore 1210. However, the report 1224 may be stored elsewhere in some examples.

The scale-out profiler circuitry 722 includes example debug-let interface circuitry 1226, which is structured to perform debugging of an Edge service via example Edge node interface circuitry 1228. The debug-let interface circuitry 1226 enables a debugging function to be performed for the Edge service by providing an interface to do so. As noted above, the Edge application may utilize a set of microservices connected in a pipeline fashion. A first microservice executing a first function on a first node may call a second function on a second node whose behavior is suspect. The debug-let interface circuitry 1226 provides a mechanism by which to perform an isolated invocation of the second function with test data to verify proper expected behavior. The debug-let interface circuitry 1226 is communicatively coupled to the Edge node interface circuitry 1228, which is an interface to an Edge node of the Edge computing system. In some examples, the debug-let interface circuitry 1226 may be communicatively coupled to a plurality of Edge node interface circuitries 1228 corresponding to various Edge nodes of the Edge computing system 702.

Disclosed examples provide a non-limiting portion of the capabilities that the scale-out tracing circuitry 714 enables. For example, the scale-out tracing circuitry 714 provides a mechanism by which to trace an Edge service from start to finish for all clients using the Edge service. The scale-out tracing circuitry 714 provides a mechanism to generate tracing data for Edge service, Edge application, cloud services, cloud application, etc. The scale-out tracing circuitry 714, by providing tracing data, may enable entities to gain valuable insights that can help the entity make better decision, can help the entity solve problems, understand performance, improve processes, etc. Accordingly, the scale-out tracing circuitry 714 opens up a whole new world of tracking and analysis previously unavailable in Edge computing.

In some examples, the scale-out profiler circuitry 722 includes means for analyzing. For example, the means for analyzing may be implemented by analysis circuitry 1212. In some examples, the analysis circuitry 1212 may be implemented by machine executable instructions such as that implemented by at least blocks 1502, 1504 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the analysis circuitry 1212 is implemented by other hardware logic circuitry, hardware implemented state machines, and/or any other combination of hardware, software, and/or firmware. For example, the analysis circuitry 1212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the scale-out profiler circuitry 722 includes means for debugging. For example, the means for debugging may be implemented by debug-let interface circuitry 1226. In some examples, the debug-let interface circuitry 1226 may be implemented by machine executable instructions such as that implemented by at least blocks 1508, 1510 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the debug-let interface circuitry 1226 is implemented by other hardware logic circuitry, hardware implemented state machines, and/or any other combination of hardware, software, and/or firmware. For example, the debug-let interface circuitry 1226 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the tracing system 700 of FIG. 7 is illustrated in FIGS. 11 and 12, one or more of the elements, processes, and/or devices illustrated in FIGS. 11 and 12 may be combined, divided, re-arranged, omitted, eliminated, and/or implemented in any other way. Further, the example scale-out-tracing circuitry 714, example monitoring device 716, example tracing server 718, example scale-out profiling circuitry 722, and/or, more generally, the example tracing system 700 of FIG. 7, may be implemented by hardware alone or by hardware in combination with software and/or firmware. Thus, for example, any of the example scale-out-tracing circuitry 714, example monitoring device 716, example tracing server 718, example scale-out profiling circuitry 722, and/or, more generally, the example tracing system 700 of FIG. 7, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example tracing system 700 of FIG. 7 may include one or more elements, processes, and/or devices in addition to, or instead of, those illustrated in FIGS. 11 and/or 12, and/or may include more than one of any or all of the illustrated elements, processes and devices.

While an example manner of implementing the scale-out tracing circuitry 714 of FIG. 7 is illustrated in FIG. 11, one or more of the elements, processes, and/or devices illustrated in FIG. 11 may be combined, divided, re-arranged, omitted, eliminated, and/or implemented in any other way. Further, the example process monitoring interface circuitry 1104, example monitoring circuitry 1108, example monitoring data collector circuitry 1116, example mapping circuitry 1118, example NTP circuitry 1120, example process monitoring circuitry 1102, example data receiving interface circuitry 1122, example scale-out profiler interface circuitry 1126, and/or, more generally, the example scale-out tracing circuitry 714 of FIG. 7, may be implemented by hardware alone or by hardware in combination with software and/or firmware. Thus, for example, any of the example process monitoring interface circuitry 1104, example monitoring circuitry 1108, example monitoring data collector circuitry 1116, example mapping circuitry 1118, example NTP circuitry 1120, example process monitoring circuitry 1102, example data receiving interface circuitry 1122, example scale-out profiler interface circuitry 1126, and/or, more generally, the example scale-out tracing circuitry 714 of FIG. 7, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example scale-out tracing circuitry 714 of FIG. 7 may include one or more elements, processes, and/or devices in addition to, or instead of, those illustrated in FIG. 11 and/or may include more than one of any or all of the illustrated elements, processes and devices.

While an example manner of implementing the example scale-out profiler circuitry 722 of FIG. 7 is illustrated in FIG. 12, one or more of the elements, processes, and/or devices illustrated in FIG. 12 may be combined, divided, re-arranged, omitted, eliminated, and/or implemented in any other way. Further, the example monitoring device interface circuitry 1202, example tracing server interface circuitry 1204, example data retrieving circuitry 1206, example analysis circuitry 1212, example aggregator circuitry 1214, example data abstraction circuitry 1216, example context abstraction circuitry 1218, example report generator circuitry 1222, example debug-let interface circuitry 1226, example Edge node interface circuitry 1228, and/or, more generally, the example scale-out profiler circuitry 722 of FIG. 7, may be implemented by hardware alone or by hardware in combination with software and/or firmware. Thus, for example, any of the example monitoring device interface circuitry 1202, example tracing server interface circuitry 1204, example data retrieving circuitry 1206, example analysis circuitry 1212, example aggregator circuitry 1214, example data abstraction circuitry 1216, example context abstraction circuitry 1218, example report generator circuitry 1222, example debug-let interface circuitry 1226, example Edge node interface circuitry 1228, and/or, more generally, the example scale-out profiler circuitry 722 of FIG. 7, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example scale-out profiler circuitry 722 of FIG. 7 may include one or more elements, processes, and/or devices in addition to, or instead of, those illustrated in FIG. 12 and/or may include more than one of any or all of the illustrated elements, processes and devices.

Figure 13:
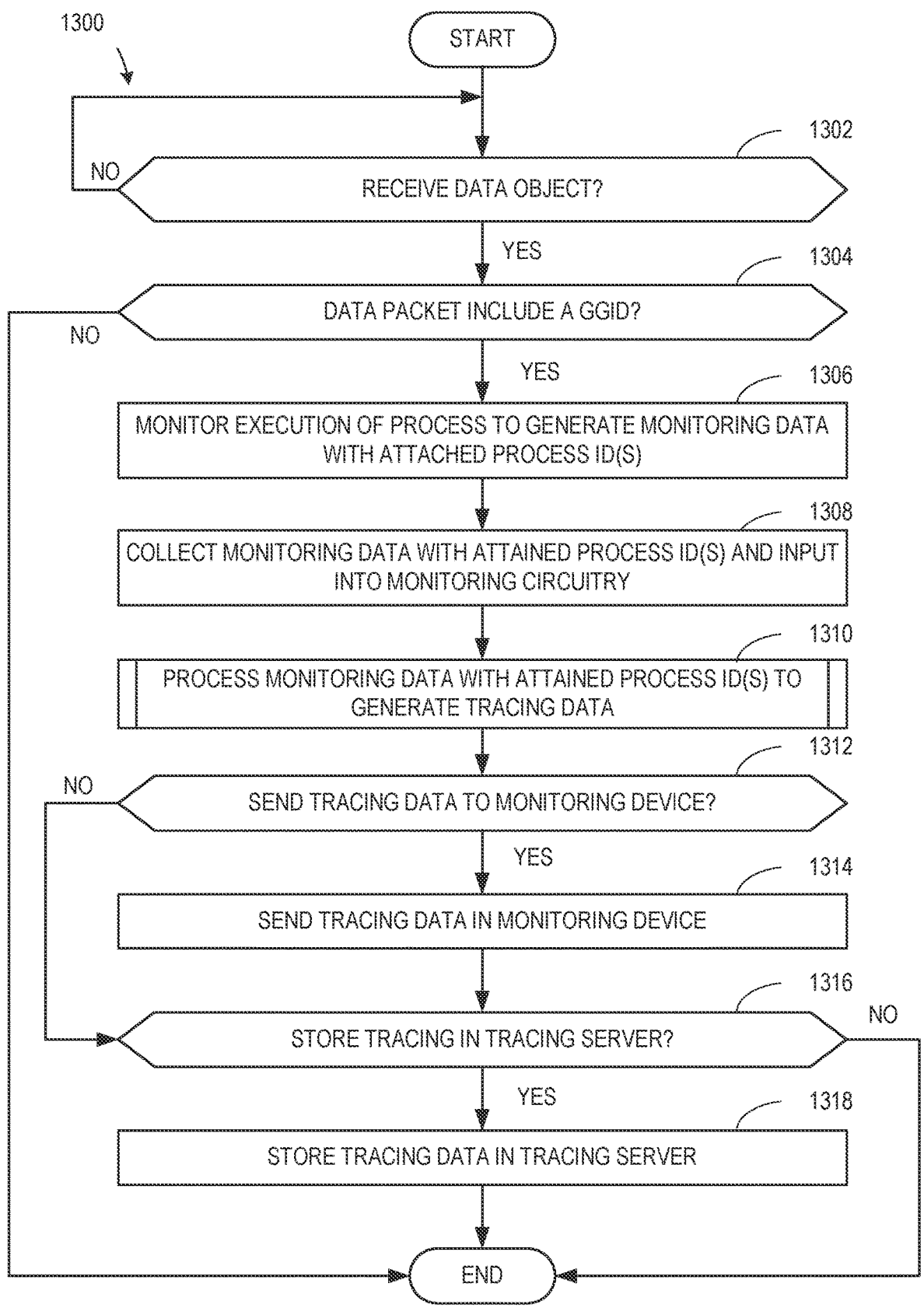
Figure 15:
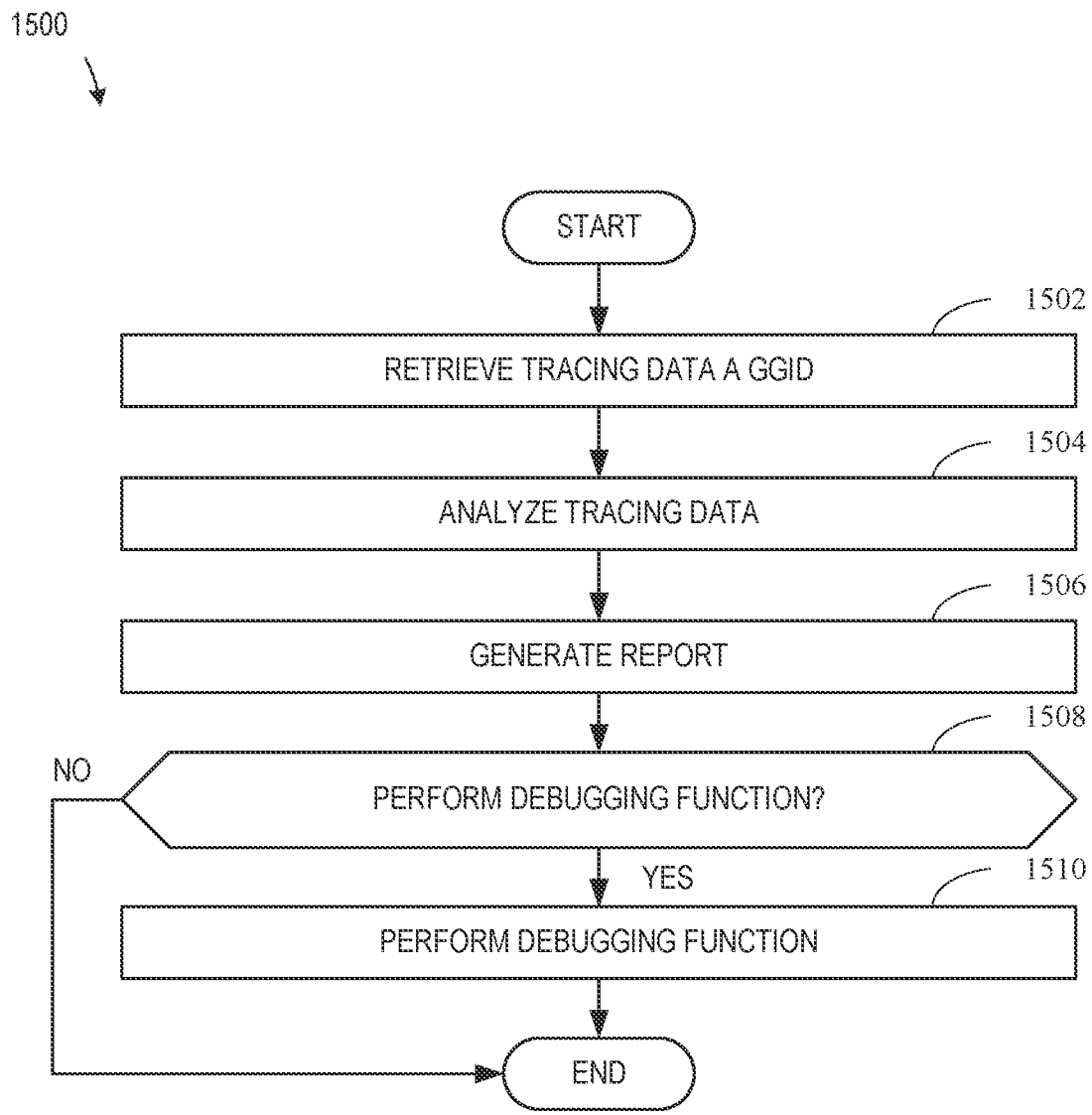
FIG. 15 is a flowchart representative of example machine readable instructions and/or example operations that may be executed by example processor circuitry to implement the scale-out profiler circuitry of FIG. 12.

A flowchart representative of example hardware logic circuitry, machine readable instructions, hardware implemented state machines, and/or any combination thereof for implementing the tracing system 700 of FIGS. 7, 11 and/or 12 is shown in FIGS. 13-15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 16, many other methods of implementing the example tracing system 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in Edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 13-15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 13 is a flowchart representative of example machine readable instructions and/or example operations 1300 that may be executed and/or instantiated by processor circuitry to trace execution of an Edge service end-to-end. The machine readable instructions and/or operations 1300 of FIG. 13 begin at block 1302, at which example process monitoring interface circuitry (e.g., process monitoring interface circuitry 1104) determines whether an Edge device received a data object. For example, the process monitoring interface circuitry 1104 may determine the data object is received at the Edge device base on a que that the data object is traversing a switch, etc. If the answer to block 1302 is NO, control advances back to the start to continue monitoring for a data object. If the answer to block 1302 is YES, control advances to block 1304 at which the process monitoring interface circuitry 1104 determines whether the data object includes a global group identifier (GGID) indicating that scale-out tracing should be initiated. For example, the process monitoring circuitry 1104 may observe a header of the packet to determine whether the header includes a GGID. If the answer to block 1304 is NO, control advances back to the start to continue monitoring for a data object. If the answer to block 1304 is YES, control advances to block 1306 at which the process monitoring interface circuitry 1104 instructs example process monitoring circuitry (e.g., process monitoring circuitry 1102) to monitor execution of a process associated with the data object to generate monitoring data with an attached process ID(s). For example, the data object may be a request for processing of data by an endpoint device and/or a request for information from the Edge device. In some examples, the data object may be data from the end point device that is to be stored. In some examples, the data object may be from another Edge device and/or an Edge data center. Regardless of the process, the process monitoring circuitry 1102 monitors the Edge device during execution of processing the data object to generate monitoring data. For example, the process monitoring circuitry 1102 may collect telemetry data, counters, etc. from existing interfaces. In some examples, the process monitoring circuitry 1102 is configured to monitor and generate specific telemetry data, etc.

Upon completion of execution of the process, example monitoring data collector circuitry (e.g., monitoring data collector circuitry 1116 obtains (e.g., retrieves and/or receives) monitoring data generated by the process monitoring circuitry 1102 and inputs the monitoring data into example monitoring circuitry (e.g., monitoring circuitry 1108) (block 1308). At block 1310, the monitoring circuitry 1108 processes the monitoring data to generate tracing data. For example, the monitoring circuitry 1108 maps the monitoring data having the process ID(s) to a corresponding GGID, synchronizes a timestamp of the monitoring data, etc.

At block 1312, the monitoring circuitry 1108 determines whether to send the generated tracing data to a monitoring device (e.g., monitoring device 716). If the answer to block 1312 is NO, control advances to block 1316. If the answer to block 1312 is YES, control advances to block 1314. At block 1314, the monitoring circuitry 1108 sends (e.g., pushes, delivers, forwards, transmits, etc.) the tracing data to example data receiving interface circuitry (e.g., data receiving interface circuitry 1122) of the monitoring device. In some examples, the example process monitoring circuitry 1102 stores the tracing data in a suitable section of an example tracing datastore (e.g., tracing datastore 1124). In some examples, the tracing datastore includes sections, each of which correspond to a specific GGID. In some examples, the suitable section would be the section for the corresponding GGID. In some examples, the monitoring circuitry 1108 stores the tracing data in the tracing datastore 1124 via the data receiving interface circuitry 1122. Control then advances to block 1316.

At block 1316, the monitoring circuitry 1108 determines whether to send the generated tracing data to a tracing server (e.g., tracing server 718). For example, the tracing system may not include a tracing server. In such examples, the monitoring circuitry 1108 determines not to send the generated tracing data to the tracing server. If the system includes a tracing server, the monitoring circuitry 1108 determines to send the tracing data to the tracing server. In some examples, the process monitoring interface circuitry 1104 instructs the monitoring circuitry 1108 to or not to send the tracing data to the tracing server. If the answer to block 1316 is NO, the operation ends. If the answer to block 1316 is YES, control advances to block 1318. At block 1318, the monitoring circuitry 1108 sends (e.g., pushes, delivers, forwards, transmits, etc.) the tracing data to example data receiving interface circuitry (e.g., data receiving interface circuitry 1122) of the tracing server. In some examples, the tracing server 718 stores the tracing data in an suitable section of an example tracing datastore (e.g., tracing datastore 1124). In some examples, the tracing datastore is includes sections, each of which correspond to a specific GGID. The suitable section would be the section for the corresponding GGID. In some examples, the monitoring circuitry 1108 stores the tracing data in the tracing datastore 1124 via the data receiving interface circuitry 1122.

FIG. 14 is a flowchart representative of example machine readable instructions and/or example operations 1310 that may be executed and/or instantiated by processor circuitry to process monitoring data with attained process ID(s) to generate tracing data. The machine readable instructions and/or operations 1310 of FIG. 14 begin at block 1402, at which the monitoring circuitry 1108 receives monitoring data having corresponding process ID(s). For example, a data object that was processed by the Edge device may include one process (e.g., one process ID) or multiple individual processes (e.g., multiple process IDs). The monitoring circuitry 1108 receives (and/or retrieves) the monitoring data from the monitoring data collector circuitry 1116.

At block 1406, example NTP circuitry (e.g., NTP circuitry 1120) determines NTP requirements of the corresponding GGID. For example, the NTP circuitry 1120 determines an accuracy requirement of the GGID, an NTP associated with the GGID, etc. At block 1408, the NTP circuitry 1120 synchronizes a time stamp of the data based on the determined NTP requirements of the corresponding GGID. For example, the NTP circuitry 1120 adjust a timestamp of the monitoring data, as necessary, and attaches an accurate timestamp to a data object having the tracing data. At block 1410, the monitoring circuitry 1108 packages the tracing data, which has been indexed and synchronized, to generate an object having the tracing data to send and/or store the tracing data. Control then advances to block 1310 of FIG. 13.

FIG. 15 is a flowchart representative of example machine readable instructions and/or example operations 1500 that may be executed and/or instantiated by processor circuitry to profile an Edge application using tracing data. The machine readable instructions and/or operations 1500 of FIG. 15 begin at block 1502, at which example data retrieving circuitry (e.g., data retrieving circuitry 1206) retrieves tracing data for a GGID. In some examples, the data retrieving circuitry 1206 retrieves the tracing data via an example monitoring device interface circuitry (e.g., monitoring device interface circuitry 1202). In some examples, the data retrieving circuitry 1206 retrieves the tracing data via example tracing server interface circuitry (e.g., tracing server interface circuitry 1204). The data retrieving circuitry 1206 retrieves the tracing server from an example tracing datastore (e.g., tracing datastore 1124).

At block 1504, example analysis circuitry (e.g., analysis circuitry 1214) analyses the tracing data. The analysis circuitry 1214 may utilize example aggregator circuitry (e.g., aggregator circuitry 1216), example data abstraction circuitry (e.g., data abstraction circuitry 1216), and/or example context abstraction circuitry (e.g., context abstraction circuitry 1218) to analyze the tracing data. The analysis of the tracing data depends on the reason for the analysis. For example, analysis requested from an Edge service to analyze performance of the service may include analyzing the tracing data based on performance metrics. In some examples, the analysis may be requested by an Edge computing system provider in order to determine a fine-grained billing scheme. At block 1506, example report generator circuitry (e.g., report generator circuitry 1224) generates a report based on the analysis of the tracing data. For example, the report may have been requested by an entity.

At block 1508, example debug-let interface circuitry (e.g., debug-let interface circuitry 1226) determines whether to performance a debugging function. For example, the debug-let interface circuitry 1226 may determine to perform a debugging function based on analysis of the tracing data. In some examples, the debug-let interface circuitry 1226 may determine to perform a debugging function based on instruction to do so (e.g., via an analyst, etc.). At block 1510, the debug-let interface circuitry 1226 performs the debugging function. For example, the debug-let interface circuitry 1226 may perform the debugging function via example Edge node interface circuitry (e.g., Edge node interface circuitry 1228).

Figure 16:
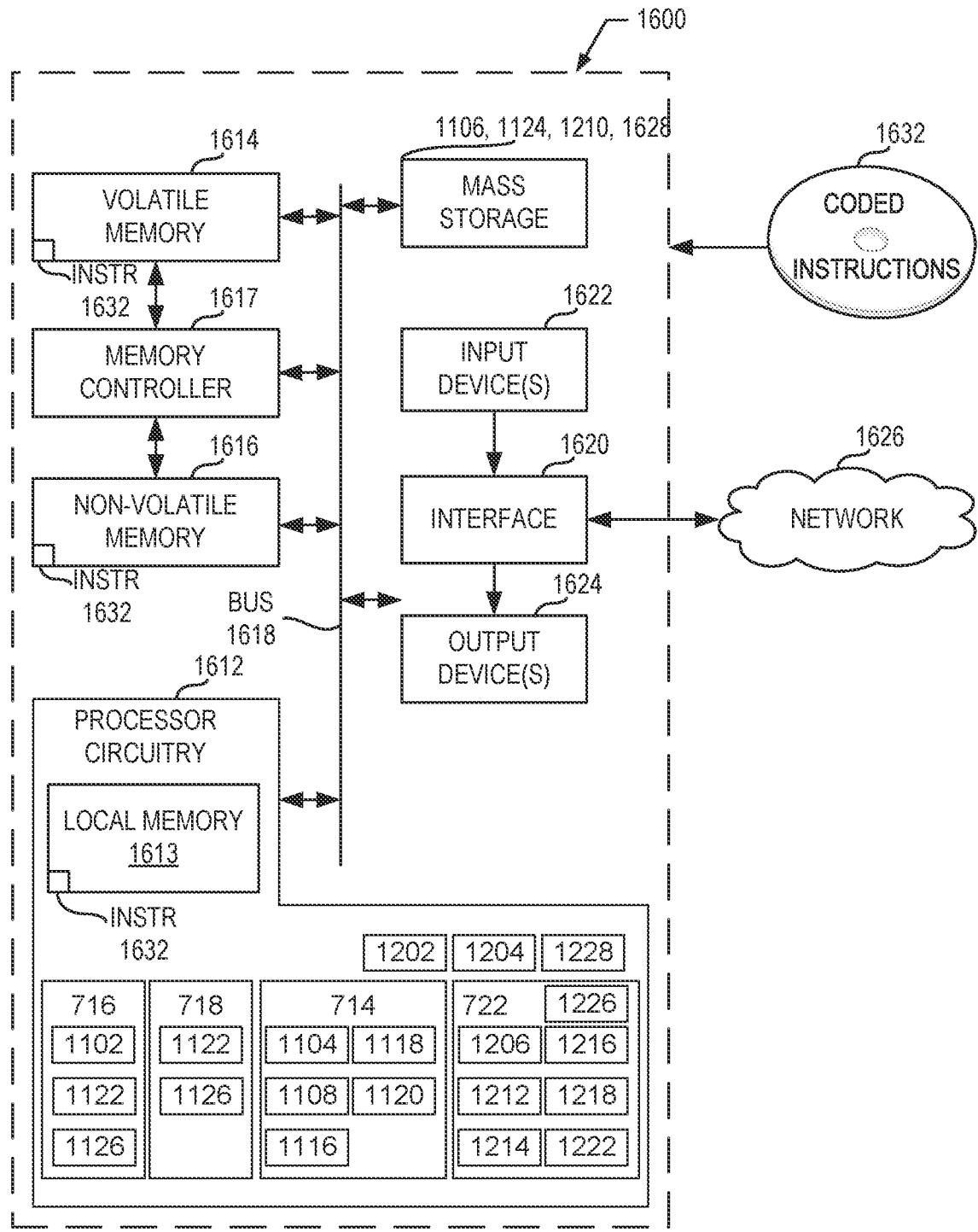
FIG. 16 is a block diagram of an example processing platform including processor circuitry structured to execute the example machine readable instructions and/or example operations of FIG. 13-14 and/or 15 to implement the example scale-out tracing circuitry of FIGS. 7 and 11 and/or the example scale-out profiling circuitry of FIGS. 7 and 12, respectively.

FIG. 16 is a block diagram of an example processor platform 1600 structured to execute and/or instantiate the machine readable instructions and/or the operations of FIGS. 13-15 to implement the tracing system 700 of FIGS. 7, 11, and/or 12 The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements example scale-out-tracing circuitry 714, example monitoring device 716, example tracing server 718, example scale-out profiling circuitry 722, example process monitoring interface circuitry 1104, example monitoring circuitry 1108, example monitoring data collector circuitry 1116, example mapping circuitry 1118, example NTP circuitry 1120, example process monitoring circuitry 1102, example data receiving interface circuitry 1122, example scale-out profiler interface circuitry 1126, example process monitoring interface circuitry 1104, example monitoring circuitry 1108, example monitoring data collector circuitry 1116, example mapping circuitry 1118, example NTP circuitry 1120, example process monitoring circuitry 1102, example data receiving interface circuitry 1122, and/or example scale-out profiler interface circuitry 1126.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1632, which may be implemented by the machine readable instructions of FIGS. 13-15, may be stored in the mass storage device 1628, in the volatile memory 1614, in the non-volatile memory 1616, and/or on a removable non-transitory computer readable storage medium such as a CD or DVD.

Figure 17:
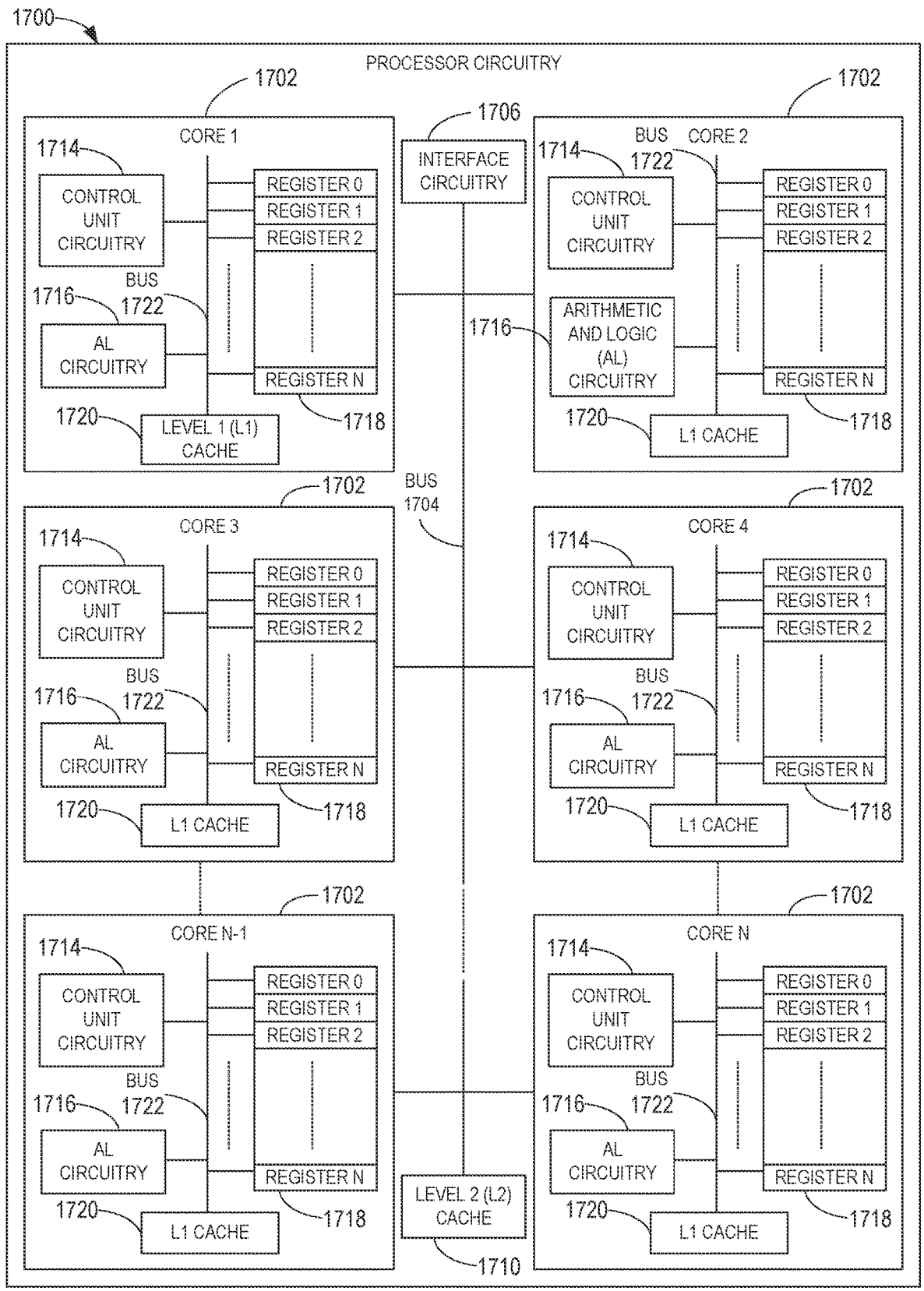
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a general purpose microprocessor 1700. The general purpose microprocessor circuitry 1700 executes some or all of the machine readable instructions of the flowcharts of FIGS. 13-14 to effectively instantiate the scale-out tracing circuitry 714 of FIG. 11 and/or the flowchart of FIG. 15 to effectively instantiate the scale-out profiler circuitry 722 of FIG. 12 as logic circuits to perform the operations corresponding to those machine readable instructions. In some such examples, the scale-out tracing circuitry 714 of FIG. 11 and/or the scale-out profiler circuitry 722 of FIG. 12 is instantiated by the hardware circuits of the microprocessor in combination with the instructions. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowchart of FIGS. 13-15

The cores 1702 may communicate by a first example bus 1704. In some examples, the first bus 1704 may implement a communication bus to effectuate communication associated with one(s) of the cores 1702. For example, the first bus 1704 may implement at least one of an Inter-Integrated Circuit (I2C) bus, a Serial Peripheral Interface (SPI) bus, a PCI bus, or a PCIe bus. Additionally or alternatively, the first bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and an example second bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1720 may implement at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
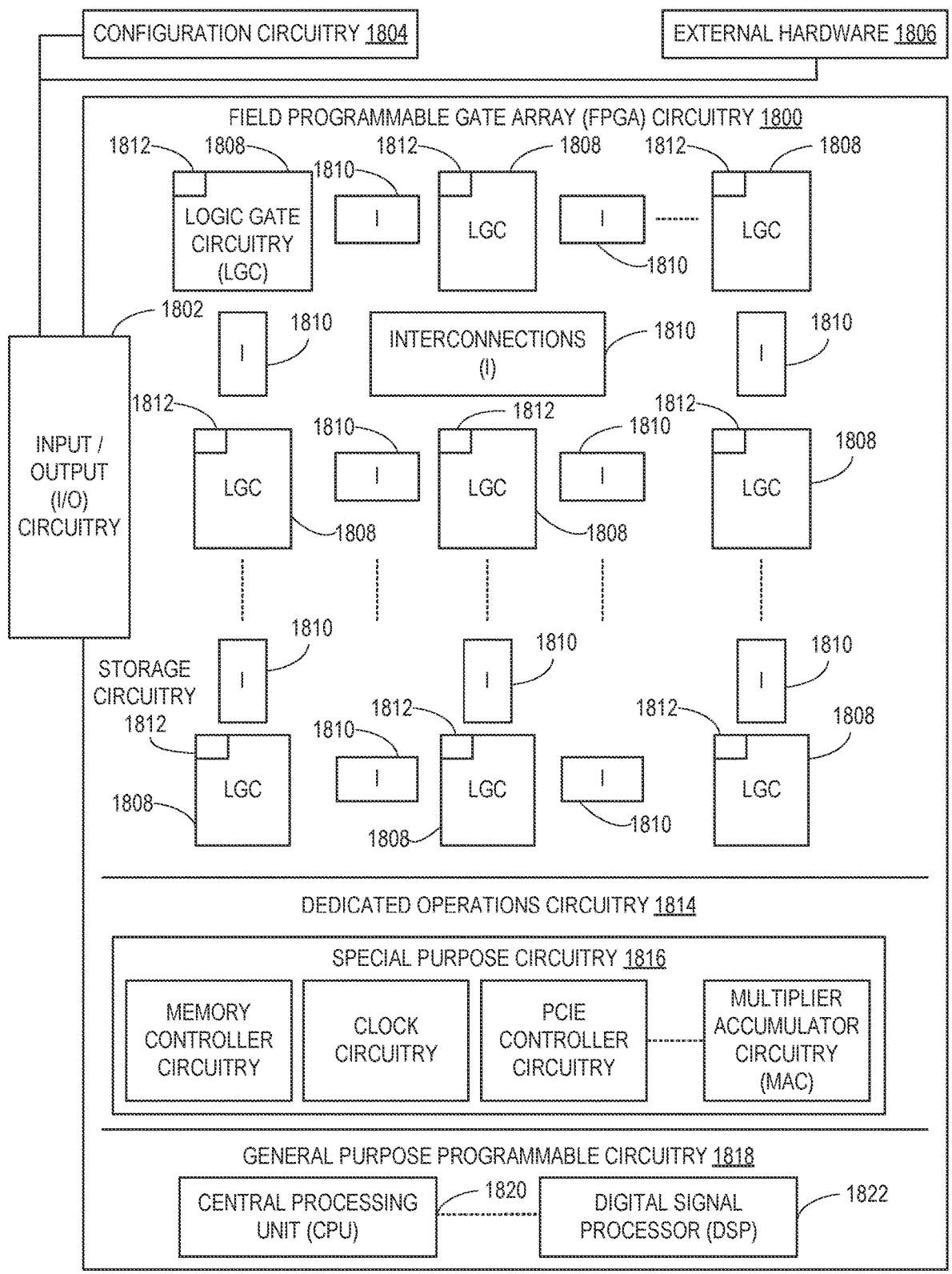
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 13-15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 13-15 In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 13-15 As such, the FPGA circuitry 1800 may be structured to effectively instantiate some or all of the machine readable instructions of the flowcharts of FIG. 13-15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 13-15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIGS. 13-15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an onboard CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIGS. 13-15 may be executed by one or more of the cores 1702 of FIG. 17, a second portion of the machine readable instructions represented by the flowcharts of FIGS. 13-15 may be executed by the FPGA circuitry 1800 of FIG. 18, and/or a third portion of the machine readable instructions represented by the flowcharts of FIGS. 13-15 may be executed by an ASIC. It should be understood that some or all of the circuitry of FIG. 11 and or FIG. 12 may, thus, be instantiated at the same or different times. Some or all of the circuitry may be instantiated, for example, in one or more threads executing concurrently and/or in series. Moreover, in some examples, some or all of the circuitry of FIG. 11 and/or FIG. 12 may be implemented within one or more virtual machines and/or containers executing on the microprocessor.

In some examples, the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
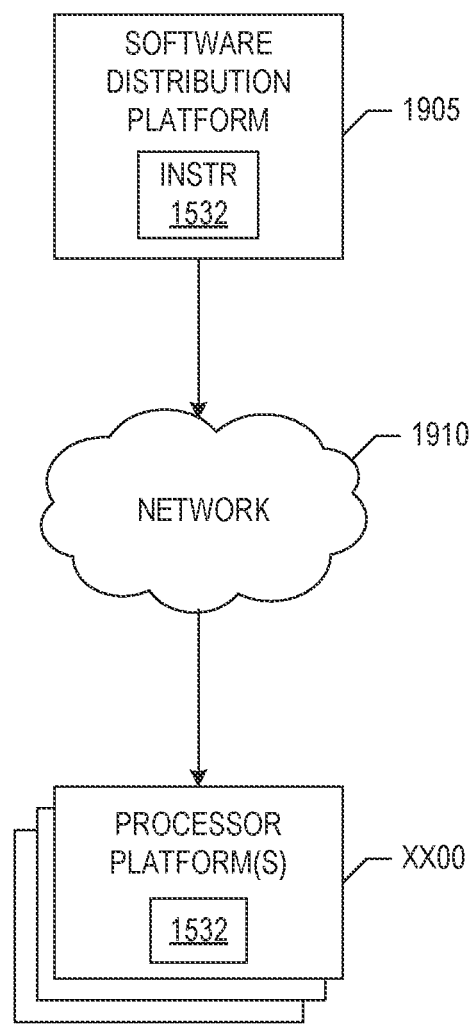
FIG. 19 is a block diagram of an example software distribution platform (e.g., one or more servers) to distribute software (e.g., software corresponding to the example machine readable instructions of FIGS. 13-14 and/or 15 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1632 of FIG. 16 to hardware devices owned and/or operated by third parties is illustrated in FIG. 19 The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions 1300, 1308, 1500 of FIGS. 13-15 as described above. The one or more servers of the example software distribution platform 1905 are in communication with a network 1910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions 1300, 1308, and/or 1500 of FIGS. 13, 14, and/or 15 may be downloaded to the example processor platform 400, which is to execute the machine readable instructions 1632 to implement the tracing system (e.g., the scale-out tracing circuitry and/or the scale-out profiling circuitry) In some example, one or more servers of the software distribution platform 1905 periodically offer, transmit, and/or force updates to the software (e.g., the example machine readable instructions 1632 of FIG. 16 to ensure improvements, patches, updates, etc., are distributed and applied to the software at the end user devices.

From the foregoing, it will be appreciated that example systems, methods, apparatus, and articles of manufacture have been disclosed that enable end-to-end hardware tracing of an Edge service and/or Edge application. Disclosed systems, methods, apparatus, and articles of manufacture improve the efficiency of using a computing device by enabling tracing of the Edge service and/or Edge application as it executes on various Edge devices through an Edge computing system. Examples disclosed herein enable analysis capabilities concerning the Edge service and/or Edge application that are not possible with current technologies. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine a location of a signal source are disclosed herein. Further examples and combinations thereof include the following:

Example 1 includes a compute device comprising at least one memory, instructions in the compute device, and processing circuitry to execute the instructions to, in response to detecting an object having a global group identifier, generate monitoring data corresponding to a respective process executing on the compute device, the monitoring data including a process identifier, index the monitoring data having the process identifier to the corresponding global group identifier, adjust a time stamp associated with the monitoring data to a network time protocol corresponding to the global group identifier, and cause transmission of the indexed and adjusted monitoring data as tracing data to a tracing datastore.

Example 2 includes the compute device of example 1, wherein the global group identifier is attached to a header of the object.

Example 3 includes the compute device of any of examples 1-2, wherein the process identifier is a unique value determined by the compute device, the compute device to attach the process identifier to the corresponding monitoring data.

Example 4 includes the compute device of any of examples 1-3, wherein the compute device is to attach the process identifier to a header of the object having the monitoring data.

Example 5 includes the compute device of any of examples 1-4, wherein the compute device is to attach the global group identifier to the header of the object having the monitoring data.

Example 6 includes the compute device of any of examples 1-5, wherein the compute device is to attach a resource identifier to the header of the object having the monitoring data, the resource identifier corresponding to the compute device.

Example 7 includes the compute device of any of examples 1-6, wherein the generated tracing data is associated with the process identifier, the global group identifier, and the resource identifier.

Example 8 includes the compute device of any of examples 1-7, wherein the tracing datastore is in a tracing server.

Example 9 includes the compute device of any of examples 1-8, wherein the tracing datastore is in a monitoring device, the monitoring device communicatively coupled to the compute device.

Example 10 includes the compute device of any of examples 1-9, wherein transmitting the tracing data is to facilitate compute device debugging.

Example 11 includes a method comprising, in response to detecting a data packet having a global group identifier, generating monitoring data corresponding to a respective process executing on a compute device, the monitoring data including a process identifier, mapping the monitoring data having the process identifier to the corresponding global group identifier, tuning a time stamp associated with the monitoring data to a network time protocol corresponding to the global group identifier, and sending the mapped and tuned monitoring data as tracing data to a tracing datastore.

Example 12 includes the method of example 11, further including parsing a header of the data packet to identify the global group identifier.

Example 13 includes the method of any of examples 11-12, wherein the process identifier is a unique value generated by the compute device, the compute device to attach the process identifier to the corresponding monitoring data.

Example 14 includes the method of any of examples 11-13, further including attaching the process identifier to a header of the data packet having the monitoring data.

Example 15 includes the method of any of examples 11-14, further including attaching the global group identifier to the header of the data packet having the monitoring data.

Example 16 includes the method of any of examples 11-15, further including attaching a resource identifier to the header of the data packet having the monitoring data, the resource identifier corresponding to the compute device.

Example 17 includes the method of any of examples 11-16, wherein the generated tracing data is associated with the process identifier, the global group identifier, and the resource identifier.

Example 18 includes the method of any of examples 11-17, wherein the tracing datastore is in a tracing server.

Example 19 includes the method of any of examples 11-18, wherein the tracing datastore is in a monitoring device, the monitoring device communicatively coupled to the compute device.

Example 20 includes the method of any of examples 11-19, wherein sending the tracing data is to enable compute device debugging.

Example 21 includes at least one non-transitory computer readable medium comprising computer readable instructions that, when executed, cause at least one processor to at least, in response to detecting a data object having a global group identifier, generate monitoring data corresponding to a respective process executing on a compute device, the monitoring data including a process identifier, associate the monitoring data having the process identifier to the corresponding global group identifier, adjust a time stamp associated with the monitoring data to a network time protocol determined by the global group identifier, and transmit the monitoring data as tracing data to a tracing datastore.

Example 22 includes the at least one non-transitory computer readable medium of example 21, wherein the global group identifier is attached to a header of the data object.

Example 23 includes the at least one non-transitory computer readable medium of any of examples 21-22, wherein the process identifier is a unique value corresponding to the compute device, the computer readable instructions to further cause the at least one processor to attach the process identifier to the corresponding monitoring data.

Example 24 includes the at least one non-transitory computer readable medium of any of examples 21-23, wherein the computer readable instructions further cause the at least one processor to attach the process identifier to a header of the data object having the monitoring data.

Example 25 includes the at least one non-transitory computer readable medium of any of examples 21-24, wherein the computer readable instructions further causes the at least one processor to attach the global group identifier to the header of the data object having the monitoring data.

Example 26 includes the at least one non-transitory computer readable medium of any of examples 21-25, wherein the computer readable instructions further cause the at least one processor to attach a resource identifier to the header of the data object having the monitoring data, the resources identifier corresponding to the compute device.

Example 27 includes the at least one non-transitory computer readable medium of any of examples 21-26, wherein the computer readable instructions further cause the at least one processor to associate the generated tracing data with the process identifier, the global group identifier, and the resource identifier.

Example 28 includes the at least one non-transitory computer readable medium of any of examples 21-27, wherein the tracing datastore is in a tracing server.

Example 29 includes the at least one non-transitory computer readable medium of any of examples 21-28, wherein the tracing datastore is in a monitoring device, the monitoring device communicatively coupled to the compute device.

Example 30 includes the at least one non-transitory computer readable medium of any of examples 21-29, wherein transmitting the tracing data is to facilitate compute device debugging.

Example 31 includes an apparatus comprising means for retrieving tracing data corresponding a global group identifier, the tracing data corresponding to processes executed on compute devices of a compute system, means for aggregating the tracing data, means for partitioning the aggregated tracing data, and means for analyzing the tracing data in view of a compute capability of ones of the compute devices, wherein the compute capability of a first compute device of the ones of the compute devices is different than the compute capability of a second compute device of the ones of the compute devices.

Example 32 includes the apparatus of example 31, wherein the tracing data includes process identifiers corresponding to ones of the processes executed on respective ones of the compute devices, ones of the process identifiers unique to respective ones of the processes and respective ones of the compute devices.

Example 33 includes the apparatus of any of examples 31-32, wherein the aggregated tracing data is based on at least one of geographic location of the ones of the compute devices or type of process executed the ones of the compute devices.

Example 34 includes the apparatus of any of examples 31-33, wherein the tracing data includes resource identifiers corresponding to respective ones of the compute devices, the ones of the resource identifiers unique to the respective ones of the compute devices, the compute capability of the ones of the compute devices based on data associated with respective ones of the resource identifiers.

Example 35 includes the apparatus of any of examples 31-34, wherein the data associated with the ones of the resource identifiers includes at least one of an amount of cores of the respective compute device or a clock speed of the respective compute device.

Example 36 includes the apparatus of any of examples 31-35, further including means to debug ones of the compute devices.

Example 37 includes an apparatus comprising interface circuitry to access tracing data, instructions, processor circuitry including one or more of at least one of a central processing unit (CPU), a graphic processing unit (GPU) or a digital signal processor (DSP), the at least one of the CPU, the GPU or the DSP having control circuitry to control data movement within the processor circuitry, arithmetic and logic circuitry to perform one or more first operations, and one or more registers to store a result of the one or more first operations or a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, the processor circuitry to execute the instructions to cause at least one of the FPGA, the CPU, the GPU, or the DSP to instantiate data retrieving interface circuitry to retrieve tracing data corresponding to a global group identifier, the tracing data including data corresponding to processes executed on compute devices of a compute system, aggregator circuitry to aggregate the tracing data, data abstraction circuitry to partition the aggregated tracing data, and context abstraction circuitry to analyze the tracing data in view of a compute capability of ones of the compute devices from which respective tracing data was generated, wherein the compute capability of a first one of the ones of the compute devices is different than the compute capability of a second one of the ones of the compute devices.

Example 38 includes the apparatus of example 37, wherein the tracing data includes process identifiers corresponding to the ones of the processes executed on respective ones of the compute devices, ones of the process identifiers unique to the respective ones of the processes and respective ones of the compute devices.

Example 39 includes the apparatus of any of examples 37-38, wherein the data abstraction circuitry is to partition the tracing data based on at least one of geographic location of the ones of the compute devices or the ones of the processes executed on the ones of the compute devices.

Example 40 includes the apparatus of any of examples 37-39, wherein the tracing data includes resource identifiers corresponding to respective ones of the compute devices, the ones of the resource identifiers unique to respective ones of the compute devices, the compute capability the respective ones of the compute devices based on data associated with the ones of the resource identifiers.

Example 41 includes the apparatus of any of examples 37-40, wherein the data associated with the ones of the resource identifiers includes at least one of an amount of cores of the respective one of the ones of the compute devices or a clock speed of the respective one of the ones of the compute devices.

Example 42 includes the apparatus of any of examples 37-41, wherein the processor circuitry is further to execute the instructions to cause at least one of the FPGA, the CPU, the GPU, or the DSP to instantiate debug-let interface circuitry to debug the one of the compute devices.

Example 43 includes an apparatus comprising at least interface circuitry to access a blockchain corresponding to a global group identifier, and at least one processor to, in response to detecting an object having the global group identifier, collect monitoring data corresponding to a respective process executing on the compute device, generate tracing data based on the monitoring data, and adding the tracing data to the blockchain.

Example 44 includes the apparatus of example 43, wherein the blockchain includes tracing data corresponding to the global group identifier from plurality of compute devices, the tracing data from the plurality of compute devices linked in chronological order.

Example 45 includes the apparatus of any of examples 43-44, wherein the blockchain corresponds to the global group identifier and to a resource identifier.

Example 46 includes the apparatus of any of examples 43-44, wherein the blockchain corresponds to the global group identifier and to an IP address corresponding to a first compute device.

Example 47 includes the apparatus of any of examples 43-46, wherein the monitoring data includes a process identifier corresponding to a process executing on a compute device, and wherein the tracing data is generated by associating the monitoring data having the process identifier to the corresponding global group identifier and adjusting a time stamp associated with the monitoring data to a network time protocol determined by the global group identifier.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   means for communicating, the means for communicating to obtain tracing data corresponding a global group identifier associated with a distributed application, the tracing data corresponding to processes executed on compute devices of a distributed system, the tracing data including monitoring data having (a) process identifiers, ones of the process identifiers associated with respective ones of the processes, and (b) resource identifiers, ones of the resource identifiers associated with respective ones of the compute devices, the tracing data including timestamps corresponding with the processes; and
   means for analyzing to:
   aggregate the tracing data based on a first objective;
   partition the aggregated tracing data based on a second objective;
   analyze the partitioned tracing data in view of compute capability differences between the ones of the compute devices to generate performance metrics corresponding to the distributed application, the compute capability differences determined based on the ones of the resource identifiers, a first compute capability of a first one of the compute devices different than the a second compute capability of a second one of the compute devices; and
   generate a report based on the performance metrics, the performance metrics including at least one of resource utilization or application execution time.

2. The apparatus of claim 1, wherein the ones of the process identifiers are unique to the respective ones of the processes and to respective ones of the compute devices.

3. The apparatus of claim 1, wherein the first objective includes at least one of geographic location of the ones of the compute devices or type of process executed the ones of the compute devices.

4. The apparatus of claim 1, wherein the means for analyzing is to determine respective compute capabilities for corresponding ones of the compute devices based on at least one of resource data associated with respective ones of the resource identifiers or a data structure having the resource data.

5. The apparatus of claim 4, wherein the resource data associated with the ones of the resource identifiers includes at least one of an amount of cores, a clock speed, a memory population, or a compute demand.

6. The apparatus of claim 1, further including means for debugging, the means for debugging to communicate with the compute devices of the distributed system to debug ones of the compute devices.

7. At least one non-transitory machine-readable medium comprising machine-readable instructions to cause at least one processor circuit to at least:
   obtain tracing data corresponding a global group identifier associated with a group of distributed services, the tracing data corresponding to processes executed on electronic devices of a distributed system, the tracing data including monitoring data having (a) process identifiers, ones of the process identifiers associated with respective ones of the processes, and (b) resource identifiers, ones of the resource identifiers associated with respective ones of the electronic devices, the tracing data including timestamps corresponding with the processes;
   aggregate the tracing data based on a first objective;
   partition the aggregated tracing data based on a second objective;
   determine resource data for ones of the electronic devices based on respective ones of the resource identifiers;
   analyze the partitioned tracing data to generate performance metrics corresponding to the group of distributed services, the analysis executed in view of differences between ones of the electronic devices, the differences determined based on the resource data; and
   generate a report based on the performance metrics, the performance metrics including at least one of resource utilization or application execution time.

8. The at least one non-transitory machine-readable medium of claim 7, wherein the first objective includes at least one of geographic location or type of process executed the ones of the electronic devices.

9. The at least one non-transitory machine-readable medium of claim 7, wherein the machine-readable instructions are to cause one or more of the at least one processor circuit to further aggregate the tracing data based on a second objective, and wherein the second objective includes a time period.

10. The at least one non-transitory machine-readable medium of claim 7, wherein the resource data includes, for respective ones of the electronic devices, at least one of a core count, a clock speed, a memory population, or competing compute demand.

11. The at least one non-transitory machine-readable medium of claim 7, wherein the machine-readable instructions are to cause one or more of the at least one processor circuit to obtain tracing data corresponding a global group identifier associated with a distributed application by accessing a blockchain for the global group identifier, the blockchain including chronological blocks, ones of the chronological block associated with respective ones of the process identifiers.

12. The at least one non-transitory machine-readable medium of claim 7, wherein the machine-readable instructions are to cause one or more of the at least one processor circuit to:
   identify a third one of the electronic devices configured to execute a first one of the processes; and
   cause the third one of the electronic devices to execute the first one of the processes based on sample data to debug the third one of the electronic devices.

13. The at least one non-transitory machine-readable medium of claim 7, wherein the group of distributed services is associated with a fanout execution plan.

14. The at least one non-transitory machine-readable medium of claim 7, wherein the second objective includes at least one of geographic location, operation, or time.

15. An apparatus comprising:
interface circuitry;
machine-readable instructions; and
at least one processor circuit to be programmed by the machine-readable instructions to:
  obtain tracing data corresponding a global group identifier associated with a distributed application, the tracing data corresponding to processes executed on electronic devices of a distributed system, the tracing data including monitoring data having (a) process identifiers, ones of the process identifiers associated with respective ones of the processes, and (b) resource identifiers, ones of the resource identifiers associated with respective ones of the electronic devices, the tracing data including timestamps corresponding with the processes;
  aggregate the tracing data based on a first objective;
  partition the aggregated tracing data based on a second objective;
  determine resource data for ones of the electronic devices based on respective ones of the resource identifiers;
  analyze the partitioned tracing data to generate performance metrics corresponding to the distributed application, the analysis executed in view of differences between ones of the electronic devices, the differences determined based on the resource data; and
  generate a report based on the performance metrics, the performance metrics including at least one of resource utilization or application execution time.

16. The apparatus of claim 15, wherein the first objective includes at least one of geographic location or type of process executed the ones of the electronic devices.

17. The apparatus of claim 15, wherein one or more of the at least one processor circuit is to further aggregate the tracing data based on a second objective, and wherein the second objective includes a time period.

18. The apparatus of claim 15, wherein the resource data includes, for respective ones of the electronic devices, at least one of a core count, a clock speed, a memory population, or competing compute demand.

19. The apparatus of claim 15, wherein one or more of the at least one processor circuit is to obtain tracing data corresponding a global group identifier associated with a distributed application by accessing a blockchain for the global group identifier, the blockchain including chronological blocks, ones of the chronological block associated with respective ones of the process identifiers.

20. The apparatus of claim 15, wherein one or more of the at least one processor circuit is to:
  identify a third one of the electronic devices configured to execute a first one of the processes; and
  cause the third one of the electronic devices to execute the first one of the processes based on sample data to debug the third one of the electronic devices.

21. The apparatus of claim 15, wherein the distributed application is associated with a fanout execution plan.

22. The apparatus of claim 15, wherein the second objective includes at least one of geographic location, operation, or time.

23. The apparatus of claim 15, wherein the distributed application is associated with a set of microservices connected in a pipeline.

* * * * *